May 29, 1956 A. H. FAULKNER 2,748,196

TELEPHONE SYSTEM

Filed May 1, 1953 7 Sheets-Sheet 1

INVENTOR.
ALFRED H. FAULKNER
BY Wm. Watts Owen
ATTY.

May 29, 1956 A. H. FAULKNER 2,748,196

TELEPHONE SYSTEM

Filed May 1, 1953 7 Sheets-Sheet 2

INVENTOR.
ALFRED H. FAULKNER
BY Mc Watters Darcy
ATTY.

May 29, 1956    A. H. FAULKNER    2,748,196

TELEPHONE SYSTEM

Filed May 1, 1953    7 Sheets-Sheet 3

FIG.3 ALLOTTER

INVENTOR.
ALFRED H. FAULKNER
BY McWatters Owen.
ATTY.

INVENTOR.
ALFRED H. FAULKNER
BY Mc Watts Owen
ATTY.

May 29, 1956 A. H. FAULKNER 2,748,196

TELEPHONE SYSTEM

Filed May 1, 1953 7 Sheets-Sheet 5

SELECTOR

INVENTOR.
ALFRED H. FAULKNER
BY [signature]

ATTY.

INVENTOR.
ALFRED H. FAULKNER
BY Wm. Watts Dunn
ATTY.

May 29, 1956 A. H. FAULKNER 2,748,196
TELEPHONE SYSTEM
Filed May 1, 1953 7 Sheets-Sheet 7
FIG. 7 CONNECTOR
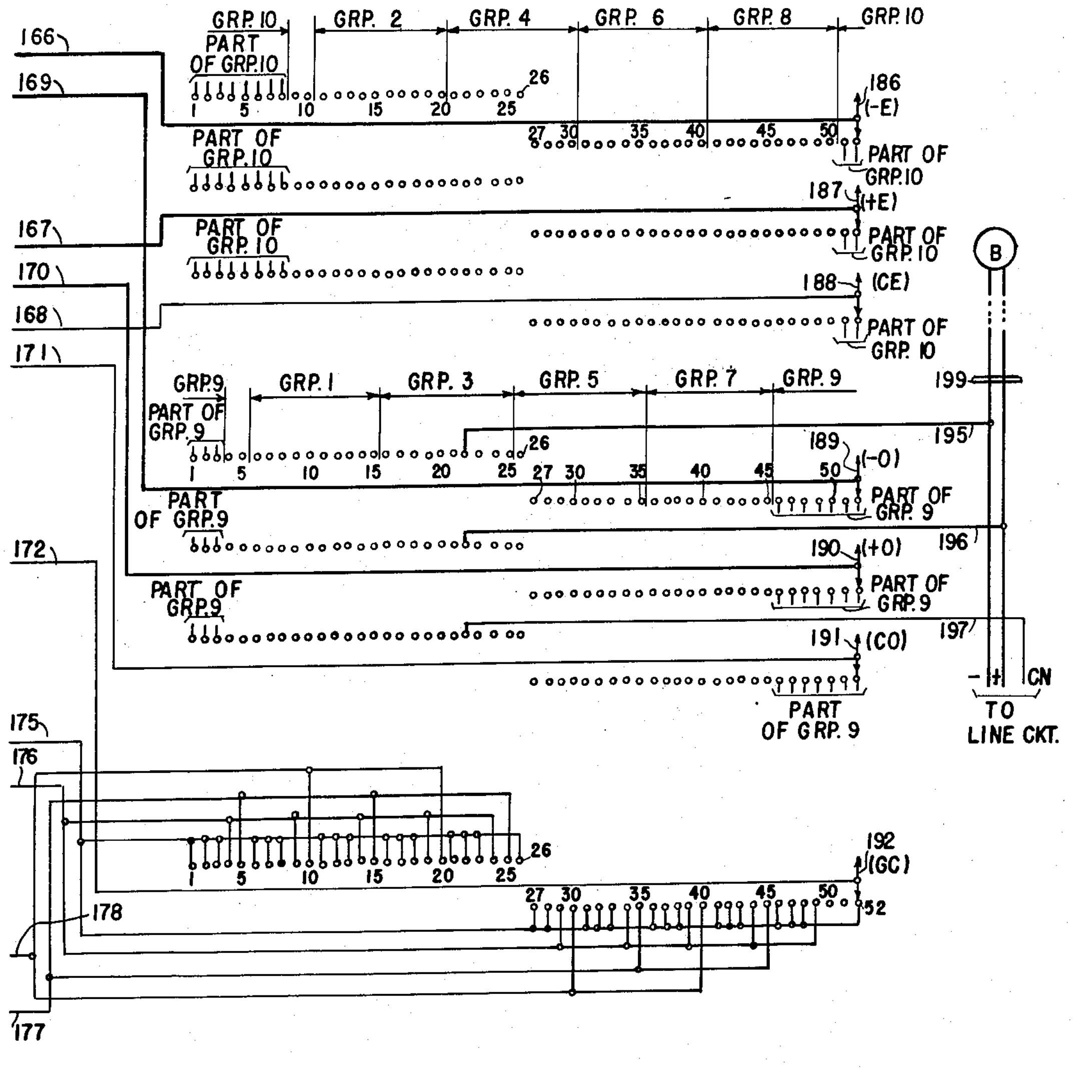
INVENTOR.
ALFRED H. FAULKNER
BY Wm. Walter Owen,
ATTY.

United States Patent Office 2,748,196
Patented May 29, 1956

2,748,196
TELEPHONE SYSTEM

Alfred H. Faulkner, Chicago, Ill., assignor to Automatic Electric Laboratories, Inc., Chicago, Ill., a corporation of Delaware Application May 1, 1953, Serial No. 352,370
45 Claims. (Cl. 179—18)

The invention relates to telephone systems and more particularly, to single-motion stepping switches for use in such systems.

Generally speaking, single-motion switches are simpler in mechanical design than switches having two directions of movement, and they require a lesser number of different parts for their manufacture and maintenance. However, in the case of the single-motion switch a greater number of outlets has to be accommodated, as a rule, in any given contact bank of the switch and it becomes necessary therefore, to speedily advance the switch wipers over this bank in order to keep the setting time of the switch within acceptable limits. In a non-numerical switch, for example, these limits are primarily determined by the requirement of returning dial tone to the calling party at as early a moment as possible, and in a numerical switch it is usually the interdigital interval that governs the time that can be allowed for the setting of the switch. Fast-stepping switches of the single-motion type are available, reference being made by way of example, to the mechanical design disclosed in U. S. Patent 2,522,715 which issued to K. W. Graybill et al. on September 19, 1950.

Stated in broad terms it is the principal object of the invention to provide means for overcoming certain difficulties, some of them outlined hereinbelow, that arise in the use of fast-stepping single-motion switches as non-numerical or numerical switches in telephone and like systems, although some of the features of the invention are also capable of wider application.

Referring first to an aspect of the invention relating more specifically to switches capable of executing a searching movement, two different methods, basically are available for controlling the searching movement of such switches, one of these methods being known as absence-of-ground searching and the other as battery-searching. In the absence-of-ground searching method the switch magnet is actuated, directly or with the aid of an interrupter relay, by a potential supplied over the test bank and wiper of the switch, the absence of this potential in a given switch position, therefore, preventing the magnet from reoperating and, thereby, causing the switch to be arrested in this position without delay. In the battery-searching method a test relay is made to operate as soon as the test wiper of the switch encounters a battery potential, thereby opening a local interrupter circuit for the switch magnet. Because of the operating time required by this test relay it becomes difficult in the case of relatively fast-stepping switches to open the interrupter circuit in time to prevent the switch from taking another step, and for this reason the absence-of-ground searching method is better suited for the control of the hunting movement of such switches.

On the other hand, the absence-of-ground searching principle has the disadvantage that it does not guard against switch-through to a connecting circuit in which, because of some unstandard conditions, battery is not available. Taking, for example, the case of a line finder of the absence-of-ground searching type, if ground is absent from the test conductor of a non-calling line circuit because of a dirty contact in that line circuit or a disconnect condition on that conductor, the line finder will be arrested in the corresponding position and neither this finder nor any other finder subsequently started is then able to advance past this position to connect with a calling line appearing beyond this position in the finder banks. In other types of switches involving a searching or hunting movement, the results are similar.

It is accordingly, one of the objects of the present invention to provide in a switch of the absence-of-ground hunting type, novel and improved means for checking the outlet found as a result of this hunting operation for the presence of battery, thereby to insure that the corresponding connecting circuit is in working condition. Under this aspect of the invention the present application is a further development of United States patent application Serial No. 345,028 by C. E. Lomax and K. W. Graybill, filed March 27, 1953.

According to one feature of the invention, the check for the presence of battery in the connecting circuit such as a line circuit in the case of a finder switch, is carried out, by the same test relay which operates, in the conventional manner, in series with the switch magnet responsive to the switch encountering an absence-of-ground condition. More particularly, this relay upon its operation is placed in a holding circuit depending upon the presence of battery in the connecting circuit and this holding circuit preferably extends over the same wiper of the switch over which the test relay operated originally. If this battery is absent the switch is automatically advanced and the absence-of-ground testing resumed in the following switch position; and only if this battery is present is the switch permitted to switch through to the respective connecting circuit.

In the preferred embodiment of the invention described hereinafter, the means for checking the line circuit for the presence of battery are concentrated in the allotter and are, thus, provided in common to a plurality of finder switches. Also, in accordance with this preferred embodiment, the allotter switch itself is equipped with means for checking the numerical switch associated with a tentatively allotted finder for the presence of battery, and this battery-checking circuit extends over a winding of the line relay of this numerical switch. This circuit if completed, also serves, therefore, to pre-operate the line relay, thereby causing holding ground immediately to be returned to the last-mentioned finder. The embodiment shown herein illustrates this feature as applied to a graded multiple finder system, i. e. a system in which a plurality of finders of different groups are associated in common with a given numerical switch such as a selector. In systems of this type provisions in the allotter for checking the numerical switch for the presence of battery, are of particular significance as more than one group of lines is affected by an unstandard condition, such as a blown fuse, in one of these switches.

Referring now more particularly to the aspect of the invention that relates to single-motion numerical switches, it is essential in switches of this type that the wipers of such a switch are speedily advanced responsive to the receipt of a group-selecting series of impulses over positions corresponding to the outlets of unwanted groups to the start position of the wanted group. This group-skipping movement of the switch and, in the case of a selector, also the trunk-hunting movement of the switch in the desired group itself, must be completed before the following numerical digit is received. This condition can be met more easily if the numerical switch is arranged to execute the afore-mentioned group-skipping movement concurrently with the receipt of the group-selecting impulse series, preferably under the joint control of the impulse responsive means of the switch and a control wiper and bank of the switch itself, the wiring of this last-mentioned bank determining the number of positions to be skipped by the switch responsive to any given impulse. An arrangement of this general kind has been proposed in United States patent application Serial No. 350,688 by C. E. Lomax, filed April 23, 1953.

The present application may be regarded, in certain respects, as a further development of the Lomax application.

This Lomax application involves a simplified group-selecting arrangement in which the afore-mentioned control bank includes a plurality of series of consecutive control contacts, the contacts of a given series being multiplied with each other and different series of contacts being sequentially activated. In this connection another object of the present invention resides in the provision of novel and improved means for insuring that the switch is advanced over a given series of these contacts in spite of the fact that the afore-mentioned impulse responsive means change their condition during the last-mentioned advance of the switch. According to one feature of this invention this is accomplished by activating the control bank of the switch over the contacts of lock-pulse relay means auxiliary to the above impulse responsive means, the locking condition of these relay means being removed preferably by the control wiper itself, only after the switch has been advanced beyond the respective series of contacts in this control bank.

A further object of the invention consists in the provision of novel and improved means for reducing, in a numerical single-motion switch having the above-mentioned simplified group-selecting arrangement, the number of switch positions that must be skipped during the group-selecting movement of the switch for any given impulse. According to one feature of the invention this is accomplished by providing the switch with a plurality of sets of wipers and banks and using a group staggering arrangement similar to that disclosed in the United States patent application Serial No. 351,086 by C. W. Frank, filed April 27, 1953. The present invention, therefore, may also be regarded as a further development of the last-mentioned Frank application.

It is another object of the present invention to provide in a single-motion numerical switch which has a plurality of sets of talking and test wipers and is arranged to execute its group-skipping movement concurrently with the receipt of the group-selecting impulse series, novel and improved means for selecting a predetermined one of the afore-mentioned wiper sets. To this end and according to another feature of the invention, the switching means which selectively make one of these wiper sets effective are operated under the control of a wiper and bank of the numerical switch itself, preferably by the above-mentioned control wiper and bank which also serves to control the group-skipping movement of the switch.

A further object of the invention consists in providing in a numerical single-motion switch involving a trunk-hunting movement, for example a selector, novel and improved means for limiting the extent of this trunk-hunting movement to the switch positions accommodating trunks of the selected group.

This object is attained in accordance with yet another feature of the invention by connecting, at the end of the group-selecting digit, the test wiper of the switch or more specifically, the junction of this test wiper with the switching relay of the switch, to predetermined contacts in the bank of the switch serving for the control of its group-skipping movement, and by activating the interrupter circuit of the switch during its trunk-hunting operation, over the test bank and wiper and the control bank and wiper of the switch in series.

Yet another object of the invention resides in the provision of novel and improved means for giving restricted service, especially with respect to the outlets of a single-motion numerical switch.

It is yet another object of the invention to provide novel and improved spark protection means for the interrupter of fast-stepping switches, particularly of the kind in which the supply of operating potential for the stepping magnet of the switch is directly controlled by a wiper of the switch.

The invention, both as to its organization and method of operation, together with other objects and features thereof, will best be understood by reference to the following specification taken in connection with the accompanying drawings. In these drawings:

Fig. 7 shows the remaining part of the circuit diagram of this connector; this figure also shows, schematically, another substation B and the subscriber's line associated with this station;

Figure 4:
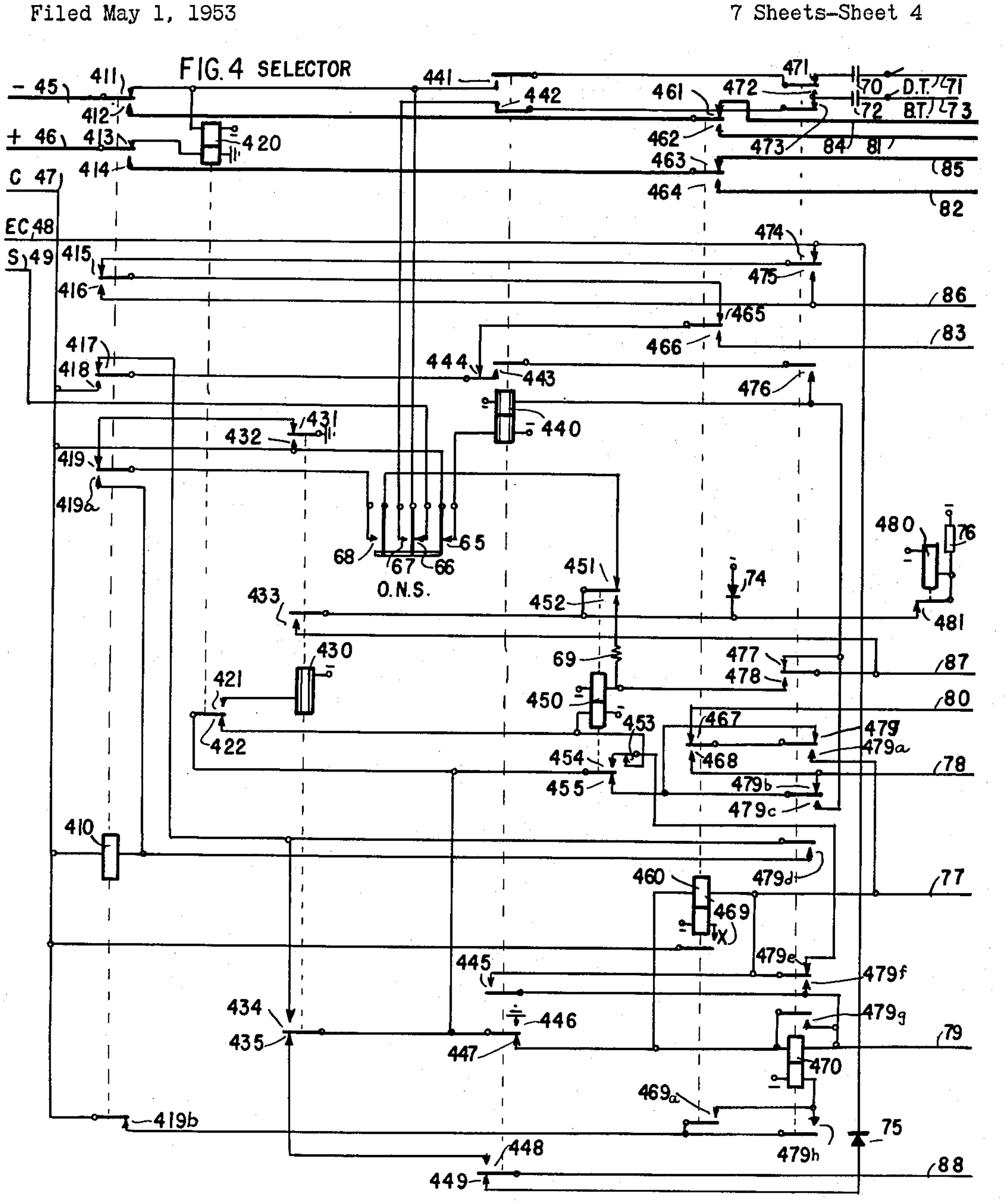
Fig. 4 is part of the circuit diagram of a selector according to the invention.
Figure 5:
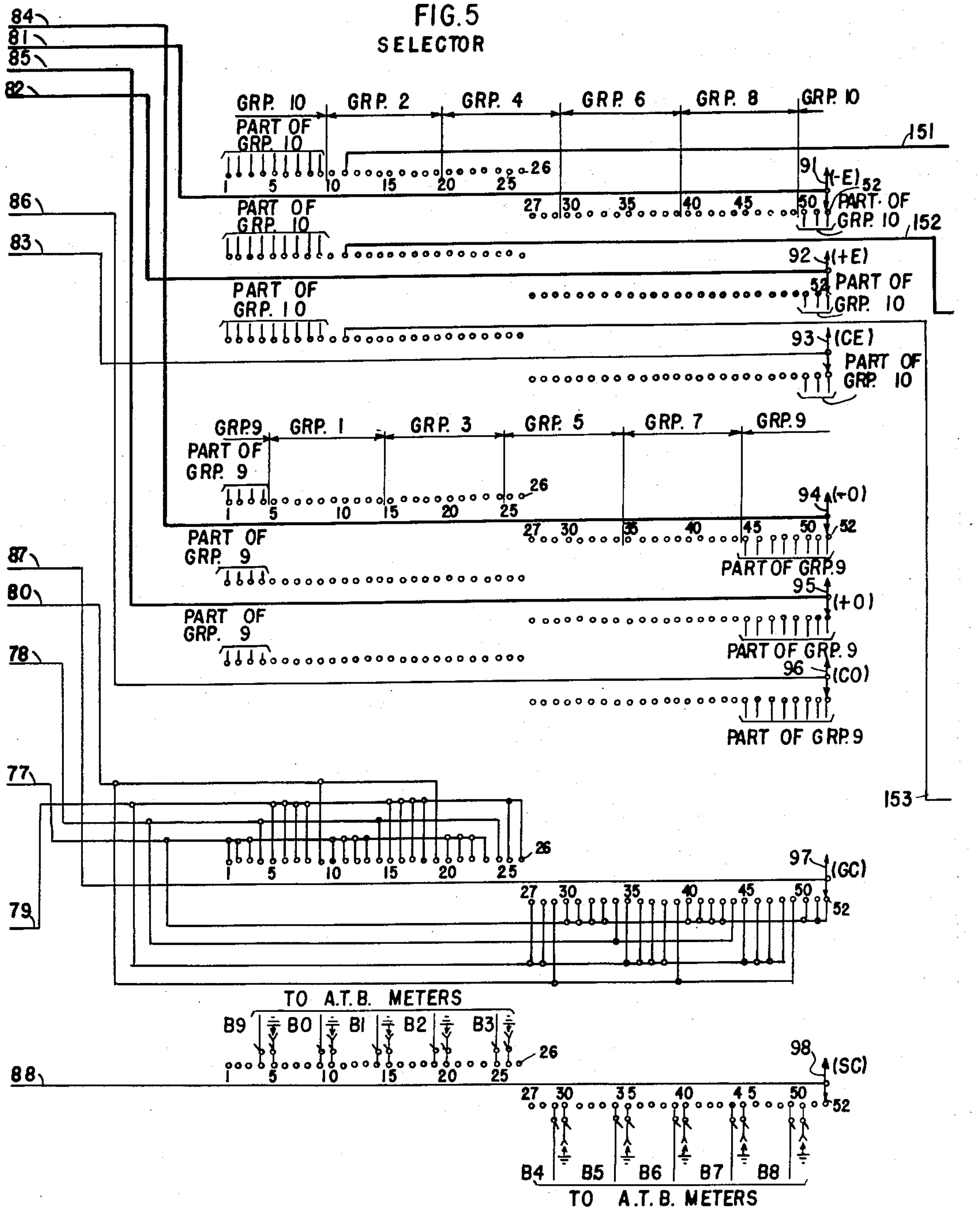
Fig. 5 represents the remaining part of the circuit diagram of this selector.

It may be mentioned at this point that the selector shown in Figs. 4 and 5 is designed, on the one hand, to function with an allotter having the battery-checking feature according to the first-mentioned aspect of the invention and incorporates, on the other hand, all the features which relate to the second-mentioned aspect of the present invention.

*General description*

Figure 1:
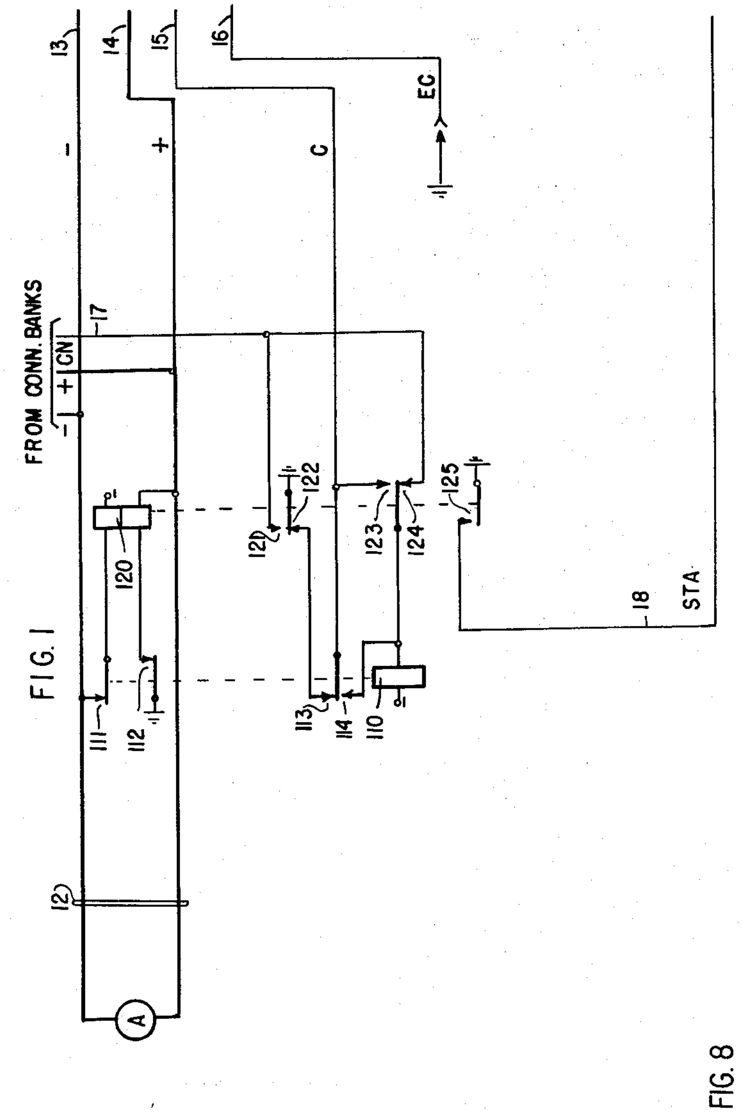
Fig. 1 is the circuit diagram of a line circuit; this figure also shows schematically a substation A connected with this line circuit by way of the associated subscriber's line.
Figure 8:
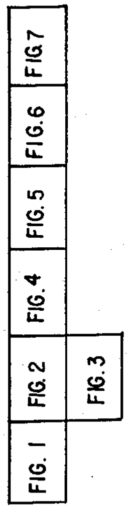
Fig. 8 illustrates how the foregoing figures should be placed with respect to each other in order to form a complete system.
Figure 2:
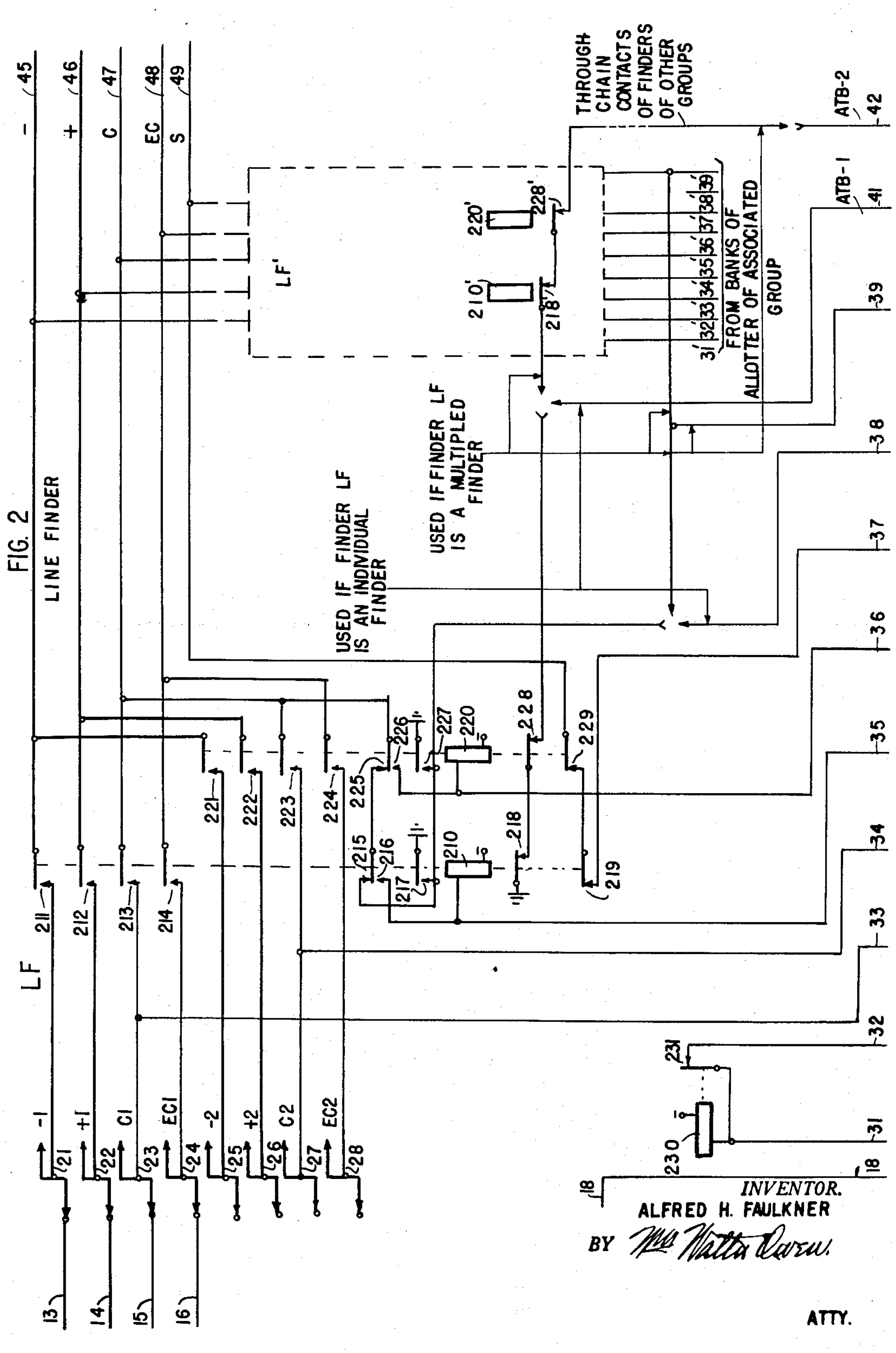
Fig. 2 is the circuit diagram of one of a group of line finders according to the invention and having access to line circuits such as that shown in Fig. 1.

A general description of the apparatus involved in the illustrated embodiments of the invention will first be given. Referring first to Fig. 1, there is illustrated a substation A which is shown connected by way of subscriber's line 12 to the line circuit associated with it in the central office. Also shown in Fig. 2 is a line finder LF which is part of a group of finders having access to a number of line circuits such as that shown in Fig. 1. Each of these line finders comprises a fast-stepping rotary multi-level switch which may be of the general type disclosed in United States Patent 2,522,715 which issued to K. W. Graybill et al. on September 19, 1950. As shown in Fig. 1, the switch has a stepping magnet 230 and associated interrupter contact 231 and has eight concentrically disposed pairs of semi-circular contact rows or banks, the two banks of each pair respectively cooperating with the two wipers of a corresponding pair of single-ended staggered wipers. Considering that there are provided two sets of wiper and bank pairs as shown and assuming that each bank has 25 contacts, each finder switch has a bank capacity of 100 lines. The switch is stepped on the de-energization of its magnet.

Figure 3:
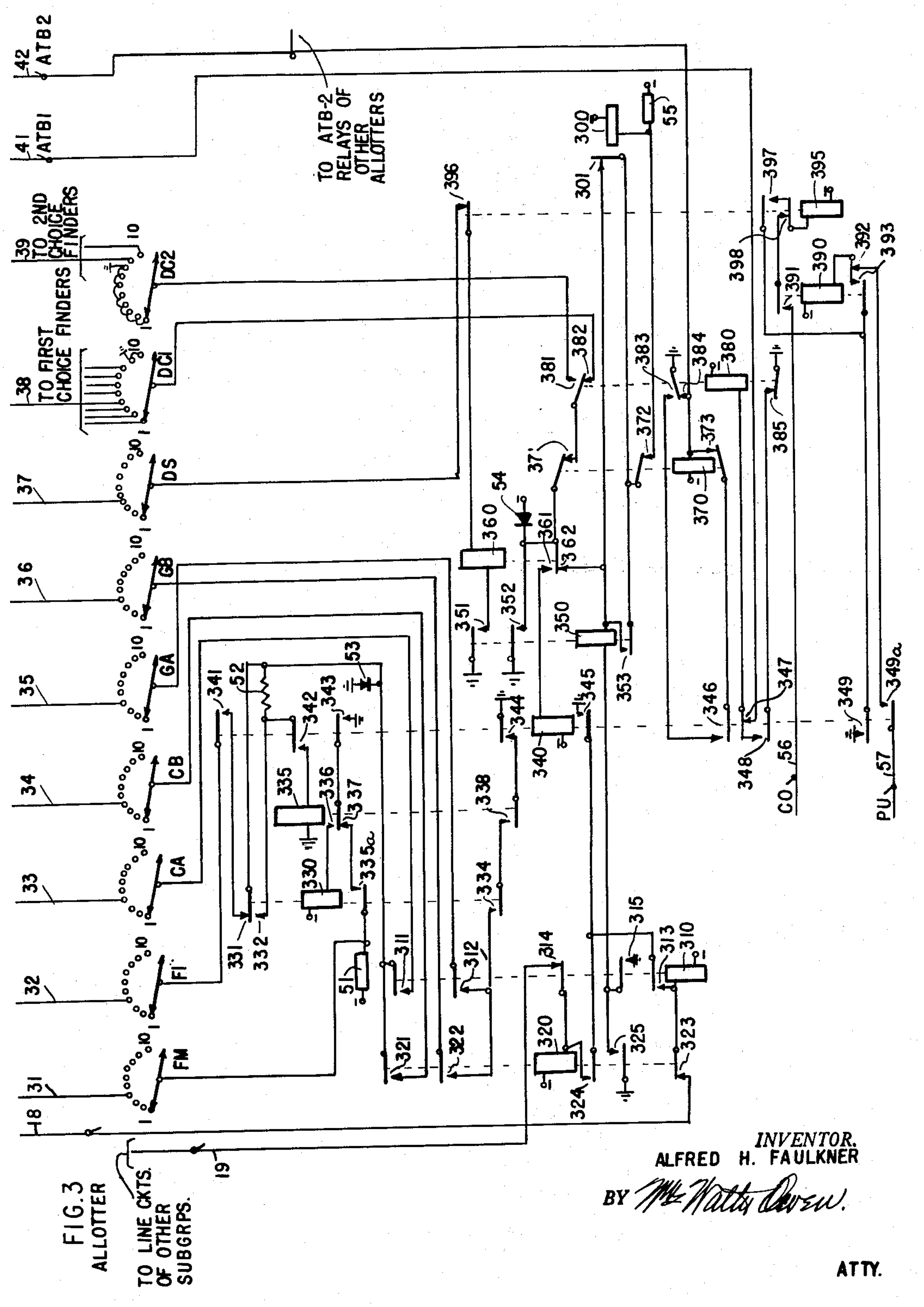
Fig. 3 is the circuit diagram of an allotter according to the present invention, this allotter being associated in common with the finders of the afore-mentioned group.

Associated with each such group of 100 lines and with the group of finders serving this line group is an allotter such as that shown in Fig. 3. This allotter has two start relays, 310 and 320, which are respectively connected to two start conductors STA and STB, these two start conductors, in turn, being respectively associated with the corresponding 50-line subgroup of the 100-line group in question. The allotter further comprises a 9-level fast-stepping rotary switch which may likewise be of the general design disclosed in the above-mentioned Graybill patent. However as shown in Fig. 3 a 10-point switch has been assumed and its wipers are of the double-ended type. The allotter switch has a magnet 300 and associated interrupter contact 301, each step being taken upon the de-energization of magnet 300.

In the embodiment illustrated and described herein a graded multiple finder system similar to that disclosed in the above-mentioned Lomax et al. application Serial No. 345,028 has been assumed. In this type of system one or more of the first numerical switches, for example selectors of the installation in question have each a plurality of finders associated therewith, each of these finders belonging to a different group. By thus providing in each of these finder groups, in addition to the individually trunked finders, one or more finders each of which is trunked to a given selector in common with a finder of one or more other groups, the number of selectors required in the system is reduced. This is predicated on the observation that the traffic peaks are likely to occur in the different line groups at different times. Thus there has been illustrated in Fig. 2 another line finder LF' belonging to a different group and accordingly served by another allotter not shown. The arrangement is such that line finder LF may be used and connected either as an individually-trunked finder or as a commonly-trunked finder in which latter case both finders LF and LF' are connected in multiple to the selector connected to the other end of the trunk comprising conductors 45—49.

This last-mentioned selector is shown in part in Fig. 4 and to another part in Fig. 5, this latter figure more particularly illustrating the wiper and bank arrangement of the selector switch. The selector switch again is of the general design disclosed in Graybill et al. Patent 2,522,715 and has a stepping magnet 480 and interrupter contact 481, each step being taken at the time magnet 480 is de-energized. As shown in Fig. 5, the switch also has two sets of pairs of talking and test wipers, collectively designated—E,+E and CE for the upper or even set and —O,+O and CO for the lower or odd set, together with the associated two sets of pairs of semi-circular talking and test banks; and the switch further mounts a pair of group control wipers GC and associated banks and a pair of special control wipers SC and associated banks, these two pairs of wipers and banks being common to the afore-mentioned two sets.

As in the case of the finder switch, Fig. 2, the wipers of the selector switch, Fig. 5, are single-ended but are connected together in pairs, the two wipers of each pair respectively cooperating with the two banks of the associated bank pair but being circumferentially displaced by 180 degrees with respect to each other. Thus, as one wiper of a pair moves off the end of its bank or level the other wiper of the pair moves into the first position of its bank or level. The foregoing relation between the wipers and their banks has been brought out in the straight line presentation according to Fig. 5 by showing the two wipers of each pair vertically in alignment but showing the two levels of bank contacts associated therewith horizontally displaced by 26 steps with respect to each other.

As shown in the above-mentioned Graybill et al. patent, the wiper collector springs are mounted in the switch position immediately in back of the first bank position proper; and the design of the Graybill switch permits the accommodation of an additional, i. e. a 26th or 52nd, complete set of bank contacts in this position of the wiper shaft namely at a point diametrically opposite the location of the wiper collector springs. In the case of the selector switch, Fig. 5, this permits the connection of an additional trunk each in positions 52 and 26 so that the total bank capacity of the switch actually is 2×52=104 trunks. More particularly, as shown in Fig. 5, there are provided 10 groups of banks, the even-numbered groups being connected to the upper set of banks and the odd-numbered groups to the lower set but in staggered relation with respect to the even-numbered groups, and groups 9 and 0 comprising 12 trunks each while each of the other groups has 10 trunks. It will also be noted from Fig. 5 that a part of the trunks of both groups 9 and 0 are accommodated at the beginning of the respective set of bank pairs. The selector switch also has a set of off-normal contacts 65—68, Fig. 4, and these contacts are arranged to be actuated, i. e. contacts 65—66 to be closed and contacts 67—68 to be opened, in position 52 of the wiper shaft, thereby marking this one position of the switch as its normal position.

The contacts of the group-selection control bank GC of the selector switch are multiplied to four control control conductors 77—80 in the manner shown in Fig. 5. Generally speaking, conductor 79 is multipled to the control contacts in the first four positions of the odd-numbered groups and conductor 77 to the first four positions of the even-numbered groups. Similarly, conductor 78 is multiplied to the control contacts corresponding to the last position of odd groups and conductor 80 to the control contacts corresponding to the last position of even groups. During the group-selecting movement of the switch conductors 77 and 79 are coupled together by way of contact 445, Fig. 4, and conductors 78 and 80 are coupled together by way of contacts 479*b*, 479 and 467 and the advance of the switch is effected by alternate energization of these two pairs of conductors; but during the trunk-hunting movement of the switch this relation is changed in a manner described in detail below to control the extent of the trunk-hunting movement.

Figure 6:
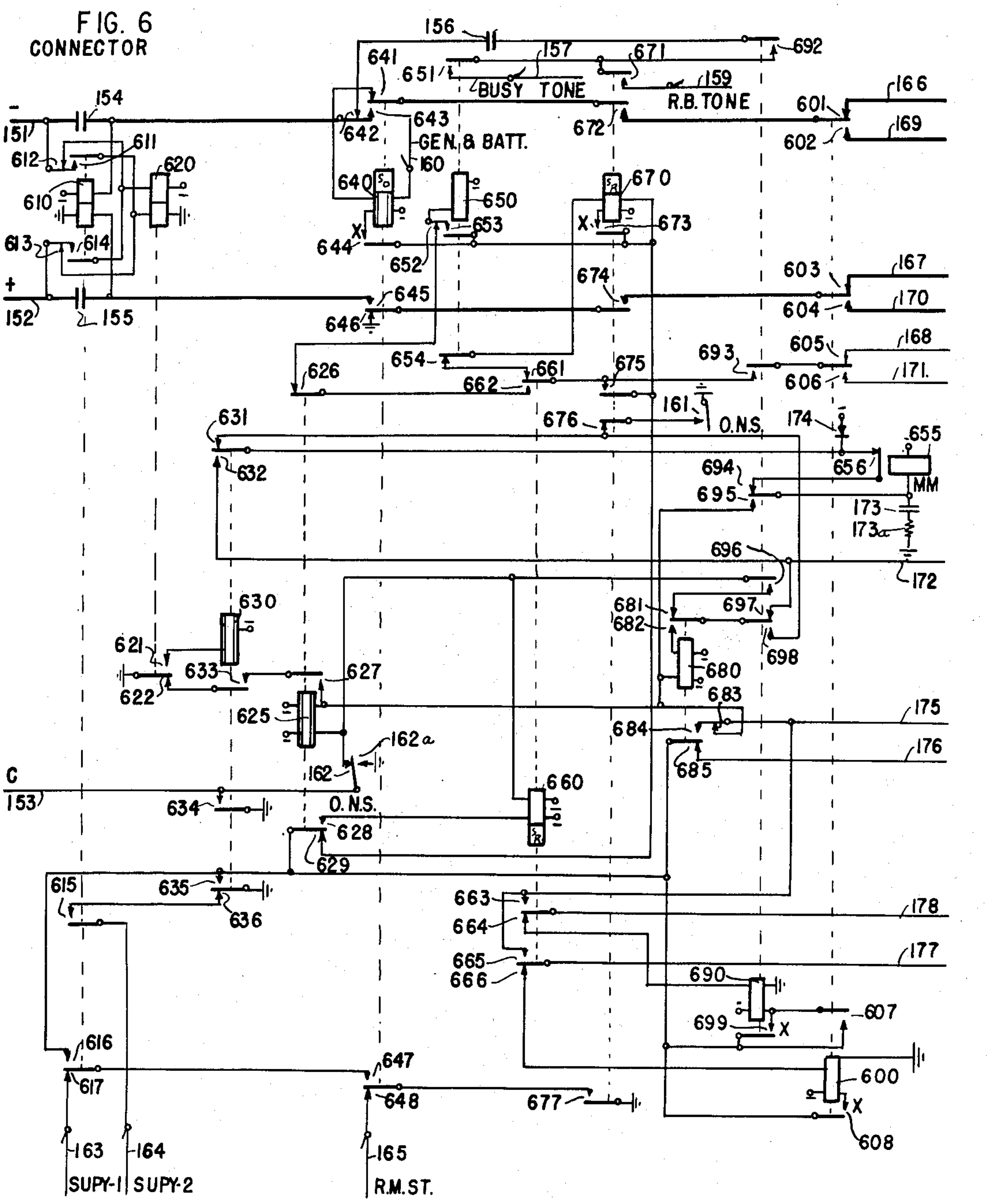
Fig. 6 is part of the circuit diagram of a connector in accordance with the invention.

The wiper and bank arrangement of the connector switch shown in Figs. 6 and 7 is similar in most respects to the selector switch arrangement just described. However, there is no counterpart in the connector to the pair of special control wipers SC and associated banks of the selector switch. Moreover, in the case of the connector switch, the first outlet of each group is connected to a switch position one step farther down the switch bank as compared with the selector switch so that the position immediately in back of the one corresponding to the first outlet of a given group may be used as a start position from which the connector wipers may be advanced into the group in direct response to the units digit. Furthermore, as the highest possible units digit is ten, each of the groups of lines connected to the connector comprises only ten lines, one such line, designated 199 in Fig. 7, giving access to a substation B. The wiring of the group control bank GC of the connector is generally similar to that of the GC bank of the selector, Fig. 5, except for the above-noted difference in the size of the groups, and for certain details in the wiring of the four control conductors for this bank.

The rectangles 55, Fig. 3; 51, Fig. 3; and 76, Fig. 4 are silicon-carbide non-linear resistance elements known as "Thyrite" resistors, which are used for spark-protection purposes in conjunction with the respective switch magnets. Rectifiers 54, Fig. 3; 53, Fig. 3; 74, Fig. 4; and 174, Fig. 6, also are used as spark-protection devices in connection with these magnets, in a manner more specifically set forth below. The EC conductors in Figs. 1, 2 and 4 are used to deny restricted subscribers access to certain groups of trunks connected to the selector banks.

*Detailed description*

In now describing the operation of the system illustrated in the drawings in detail it will be assumed that the subscriber at substation A, Fig. 1, wishes to place a telephone call to the subscriber at station B, Fig. 7, whose directory number is 237. When the calling subscriber lifts his handset from the cradle, a loop circuit is closed over subscriber's line 12 which circuit extends from ground at contact 112 through the lower winding of line relay 120, positive line conductor 14, closed switch hook contacts, not shown, at substation A, negative line conductor 13, contact 111, upper winding of relay 120 to battery. Relay 120, upon operating in this circuit, at contact 122 removes ground from finder test conductor 15 which is normally connected to this conductor by way of contact 113, to mark this calling line circuit by absence of ground in the finder banks; at 124 disconnects battery through the winding of cut-off relay 110 from conductor 17 and at 121 marks this line circuit as busy in the connector banks; at 123 connects the last-mentioned battery to finder test conductor 15, thereby providing an additional marking of this line in the finder banks and prepare the operation of cut-off relay 110; and at 125 grounds start conductor 18 which is common to the first 50-line subgroup of the hundred group which is served by the finder group including finder LF, Fig. 2. Incident to the afore-mentioned connection of ground to start conductor 18 start relay 310 in the allotter, Fig. 3, operates by way of contact 323.

*Allotter and finder*

The allotter, Fig. 3, is of the pre-selecting type and the pre-selecting operation of the allotter will be described in detail further below. At this point it will be assumed that the line finder, LF, shown in Fig. 2 is wired as an individually trunked finder in the manner shown in Fig. 2, and that as result of ground being absent from test or guard conductor 38 due to finder LF being idle, the allotter switch has pre-selected finder LF and the wipers of this switch have accordingly come to rest in position four to which the last-mentioned finder is connected. In this connection it may be mentioned that the allotter switch is arranged to select the individual finders in preference over the multipled finders, the guard conductors of the individual or first-choice finders being accessible to the DC1 wiper of the switch which is normally connected up and the guard conductors of the multipled or second-choice finders being accessible to the DC2 wiper of the switch which is substituted for the DC1 wiper only upon the release of relay 380 incident to all first-choice finders becoming busy.

When start relay 310 operates as mentioned above it disconnects at 314 the winding of the other start relay 320 from the associated start conductor 19; and at 315 the following circuit is closed for relay 350 in series with allotter switch magnet 300: ground, contact 315 of relay 310, winding of relay 350, contacts 301 and 372, winding of magnet 300, battery. Moreover, a multiple battery connection for the winding of relay 350 is, ordinarily, available by way of contacts 362, 371, 382, DC1 wiper in position 4, conductor 38, contacts 215, 225, conductor 47, selector off-normal contact 65, lower winding of relay 440, battery. Due to the comparatively high resistance of relay 350 magnet 300 does not operate in series with relay 350 but relay 350 itself operates. In operating, relay 350 at contact 352 connects direct ground to its own right-hand terminal as well as to wiper DC1 of the allotter switch; at contact 353 prepares a locking circuit for itself which is independent of interrupter contact 301; at contact 351 connects relay 360 into the following circuit extending over S conductor 49 for checking the selector, Fig. 4, associated with line finder LF for the presence of battery: ground, contact 351, winding of relay 360, contact 396, wiper DS in position 4, conductor 37, contacts 219, 229, S conductor 49, selector off-normal contact 66, upper winding of relay 420, battery.

If the last-mentioned battery-checking circuit remains incomplete, for instance if the fuse of the finder-selector combination is blown or if the selector switch mechanism because of some unstandard condition is off-normal or if ground is absent from guard conductor 38 merely because of a dirty contact although finder LF is actually busy and the battery-checking circuit accordingly open at contact 219 or 229. If the battery-checking circuit for any of the foregoing reasons is not completed, relay 360 cannot operate and as a result, magnet 300 of the allotter switch is energized over the following circuit: ground, contacts 352, 362, 301 or 353, 372, winding of magnet 300, battery. Magnet 300 in operating opens its interrupter contact 301 but the energization of magnet 300 is maintained over contact 353 of relay 350. Shortly thereafter the last-mentioned relay restores due to being short-circuited by ground over contacts 352 and 362, thereby opening the magnet circuit at contacts 352 and 353 and further disabling the battery-checking circuit at contact 351. Magnet 300 accordingly releases, thereby re-closing its interrupter contact 301 and advancing the allotter switch from position 4 to position 5. If the line finder accessible over position 5 of the allotter switch is busy, ground is connected, for instance at a contact of this finder corresponding to contact 217 of switching relay 210 or contact 227 of switching relay 220 in Fig. 2, and consequently allotter switch magnet 300 is re-energized in a circuit extending from ground on the last-mentioned guard conductor by way of wiper DC1 in position 5, contacts 382, 371, 362, 301 and 372 through the winding of magnet 300 to battery; the same ground prevents relay 350 from operating at this time. Magnet 300, upon operating, opens its contact 301 so that the magnet is released and the allotter switch advanced into position 6. This cycle of operation repeats itself until an idle finder is found. As ground is absent from the guard conductor of this finder, magnet 300 cannot be re-operated, instead, relay 350 operates in series with magnet 300 in the intially traced circuit, with the result that by the closure of contact 351 the finder-selector combination reached over position 7 of the allotter switch is checked for the presence of battery in the manner explained above. In case this battery circuit, too, cannot be completed so that relay 360 fails to operate, ground at contact 352 again causes magnet 300 to be energized and relay 350 released by short-circuiting so that the allotter switch is again started on an absence-of-ground hunting operation in search of another idle finder.

The allotter switch thus does not come to a final rest, until an idle finder has been found whose associated selector has battery connected to its S conductor. The circuit operations that take place in this instance will now be described by reverting to the point of this description at which the battery-check with respect to finder LF, Fig. 2, and its associated selector, Fig. 4, was initiated by the closure of contact 351 with the finder switch in position 4. Assuming now that this circuit can be completed due to the presence of battery on S conductor 49, relay 360 operates, thereby opening its contact 362 to disconnect ground over the DC1 wiper and over contact 352 from the junction of the windings of relay 350 and magnet 300 and at contact 361 connect this ground to the winding of relay 340. As the upper winding of line relay 420 of the selector, Fig. 4, is included in the battery-checking circuit, this last-mentioned relay also operates; and changeover relay 440 in the selector operates in the following circuit extending over test conductor 47: ground, contacts 352, 371, 382, DC1 wiper in position 4, conductor 38, contacts 215 and 225, conductor 47, off-normal contact 65, lower winding of relay 440, battery. With both relays 420 and 440 operated, hold relay 430 operates by way of ground, contacts 446 and 421, winding of relay 430, battery and at contact 432 connects ground to incoming test conductor 47 to prepare the holding of finder LF from the selector.

When relay 340, Fig. 3, operates, upon the closure of contact 361, a holding circuit for start relay 310 is closed by way of contacts 345 and 313; and at contacts 341, 342 relay 335 which serves as a common test relay for the finder group served by this allotter is placed in series with magnet 230 of finder LF by way of the following circuit: ground, relay 335, contact 342, resistor 52, contacts 331 and 341, wiper F1 in position 4, conductor 32, interrupter contact 231, finder magnet 230, battery. Also as a result of the closure of contacts 341, 342, the junction of relay 335 and magnet 230 as represented, say, by the right-hand terminal of resistor 52 is connected to the upper test wiper 23 of finder LF by way of contact 311, wiper CA in position 4, conductor 33.

Assuming first that the calling line as shown in Fig. 2 is connected to the finder banks in the position in which finder LF happens to rest, ground is absent from the corresponding test conductor 15 due to contact 122, Fig. 1, being open. Therefore, as no shorting ground is available for test relay 335, the latter operates in series with finder magnet 230 in the circuit traced above. Due to the combined resistance of the winding of relay 335 and resistor 52, magnet 230 cannot operate in this circuit. Test relay 335 in operating, at contact 338 prepares a circuit for switching relay 210 and at contact 336 causes the operation of a test control or auxiliary relay 330. Relay 330, in operating, at contact 331 disconnects the finder magnet from test relay 335 and test wiper 23 and at contact 332 short-circuits resistance 52, thereby placing this last relay for battery-checking purposes, in a holding circuit extending over test wiper 23 which circuit does not include resistance 52. At contact 334 relay 330 closes the following circuit for finder switching relay 210: ground, contacts 344, 338, 334, 312, wiper CA in position 4, conductor 35, winding of relay 210, battery. However, this relay does not operate as yet, as the relay because of a relatively stiff spring adjustment or, alternately, an armature end slug or similar means is made slow-to-operate.

The further operation of the circuit depends on whether or not a battery potential is available on test conductor 15 of the calling line. Assuming first that battery is properly connected to this conductor, namely by way of the winding of cut-off relay 110 and contact 123, test relay 335 is held in series with cut-off relay 110 in the following circuit: ground, relay 335, contacts 342, 332, 311, CA wiper, conductor 33, test wiper 23, conductor 15, contact 123, winding of relay 110, battery. As a result, auxiliary relay 330 remains operated at contact 336 and switching relay 210 continues to be energized so that slow-acting relay 210 operates. At contacts 211, 212, 213 and 214 the last-mentioned relay switches finder wipers 21, 22, 23 and 24 through to conductors 45, 46, 47 and 48 respectively; at contact 216 the relay locks to ground at contact 432, Fig. 4, by way of contact 225 and test conductor 47; at contact 217 grounds guard conductor 38; at contact 218 removes a multiple ground from all-first-choice-finders busy conductor 41; and at 219 opens S conductor 49. Incident to the short-circuiting of resistance 52 at 332, line cut-off relay 110 operates in the above-mentioned battery-checking circuit. At 114 relay 110 locks to test conductor 15 independent of contact 123; and at 111 and 112 disconnects line relay 120. This latter relay, in restoring, at contact 124 extends ground on finder test conductor 15 by way of contact 114 to connector test conductor 17; at contact 121 removes the ground previously applied to the last-mentioned conductor; and at 125 removes ground from start conductor 18. The release of the allotter incident to the last-mentioned removal of start ground and to the opening of the S conductor at contact 219 will be described further below.

It will now be assumed that at the time auxiliary relay 330 operated, the battery-checking or holding circuit for test relay 335 cannot be completed. This is the case if the absence of ground from the finder test conductor was due to a disconnect condition on this conductor or due to a contact such as 122 or 113 being dirty without a call having been initiated on the particular line circuit, Fig. 1; and it is also the case if, although the line circuit, Fig. 1, is in calling condition, the winding of cut-off relay 110 is not effectively connected to test conductor 15 because of dirt on a contact such as 123. In the first-mentioned case any started finder would be arrested in the position corresponding to the faulty line circuit when it reaches that position and would, therefore, be unable to reach and serve any line circuit in calling condition that is connected to a subsequent point in the finder banks; and in the second-mentioned case the cut-off relay could not be operated to disconnect and release the line relay, and this would keep the allotter in started condition and might interfere with the further setting up of the connection. If the battery-checking circuit for any of these reasons cannot be completed, test relay 335 releases, subsequent to the operation of relay 330, due to the absence of holding battery for relay 335. Upon releasing, relay 335 at contact 338 opens the energizing circuit of slow-acting switching relay 210, thereby preventing the operation of this relay; at 336 opens the circuit of auxiliary relay 330 and at 337 closes the following new circuit to finder magnet 230: ground, contacts 343, 337, 335a, FM wiper in position 4, conductor 31, magnet 230, battery, this circuit being independent of interrupter contact 231. Finder magnet 230 operates in the last-traced circuit. Immediately thereafter, namely at the time auxiliary relay 330 releases, the magnet circuit is re-opened at contact 335a and the finder switch accordingly advanced one step. Also upon the release of relay 330, contact 334 opens another point in the circuit of switching relay 210; and contacts 332, 331 transfer test relay 335 from its incomplete holding circuit back into its original series connection with finder magnet 230 by way of interrupter contact 231, the junction of relay 335 and magnet 230 thereby being connected to test wiper 23 again.

As a result, the test conductor reached by this test wiper upon completion of the last-mentioned step is now tested for the absence of ground. If ground is present on this conductor due to the corresponding line circuit not being in calling condition, test relay 335 is prevented from operating in series with magnet 230 due to this ground short-circuiting the winding of relay 335 and, instead, magnet 230 is operated from this direct ground in a circuit extending over test wiper 23, conductor 33, CA wiper in position 4, contacts 311, 331, 341, F1 wiper in position 4, conductor 32, interrupter contact 231 and the winding of magnet 230 to battery. When contact 231 opens, the magnet is de-energized again so that the magnet in releasing recloses contact 231 and causes the finder switch to take another step. In this manner the finder switch is advanced from position to position until a test conductor is found from which ground is absent so that the short-circuit across relay 335 is removed and this test relay operates in series with magnet 230. Relay 335 and 336, again operates auxiliary relay 330 which again causes test relay 335 to be switched into a battery-checking circuit as above described in connection with the line circuit Fig. 1. If the battery-checking circuit is completed this time, relay 335 holds, thus permitting relay 210 to switch line finder LF through in the position reached. If the battery circuit again cannot be completed the switch again is advanced to the next following position and the absence-of-ground testing and, if necessary searching action resumed until finally a line circuit having battery but not ground connected to its test conductor is found and the finder switched through to that line circuit.

In the foregoing description it was assumed that the finder switch initially happened to rest on a calling line circuit. If, instead, ground is present on the test conductor on which the finder test wiper rests initially, the switch is immediately started on an absence-of-ground searching operation similar to the one just described.

The freeing of the allotter incident to the operation of switching relay 210 and cut-off relay 110 will now be described. As mentioned above, when relay 210 operates it opens the S conductor at 219 but line relay 420 of the selector the upper winding of which was included in the circuit extending over this conductor is held in the calling loop which now extends to this relay as follows: substation A, line conductors 13, 14, finder wipers 21, 22, contacts 211, 212, conductors 45, 46, contacts 411, 413, upper and lower winding of relay 420 to battery and ground respectively. On the other hand, relay 360 in the allotter restores upon the opening of the S conductor, thereby at 361 opening the circuit of relay 340 and at 362 re-connecting the DC1 wiper to the junction between relay 350 and allotter switch magnet 300. As a result relay 340 restores and this relay in turn, permits relays 335, 330 and 310 to release, the last-mentioned relay under the assumption that no other call is waiting in the first subgroup, whereas switching relay 210 is held in the above-mentioned locking circuit extending over conductor 47. Ground connected to guard conductor 38 at contact 217 causes the energization of allotter switch magnet 300 by way of its interrupter contact 301 and, if relay 350 should still be operated, in parallel thereto through contact 353. If relay 350 is still operated due to relay 310 or 320 being operated because of other waiting calls, relay 350 restores due to its winding being short-circuited by the afore-mentioned ground from contact 217. With contact 353 of relay 350 open and interrupter contact 301 likewise open, namely because of the operation of magnet 300, the energizing circuit for this magnet is broken and the magnet releases, re-closing contact 301 and advancing the wipers of the allotter switch from position 4 to position 5. If ground is absent from the guard conductor connected to bank DC1 in this position due to the respective finder being idle, the allotter switch comes to a rest in this position, having thus pre-selected the last-mentioned finder. On the other hand, if this finder is busy and the corresponding guard conductor accordingly grounded, magnet 300 advances the allotter switch to the next following position and so on until an ungrounded guard conductor is found.

It should be noted that the foregoing pre-selecting operation is carried out by the allotter regardless of whether other calls are waiting. If no calls are waiting the allotter switch is stopped on the idle finder found without seizing this finder. If another call is waiting or if one subsequently is originated relay 350 operates from ground at contact 315 or 325 in series with magnet 300, the absence of ground from guard wiper DC1 permitting such operation. The closure of contact 351 of relay 350 then causes the pre-selected finder and associated selector to be checked for the presence of battery, the failure of relay 360 to operate in the battery-checking circuit causing the renewed advancement of the allotter switch in search for another finder as described hereinabove. This means that the battery check is not performed and a successfully checked finder seized unless or until a call in either subgroup is waiting to be served.

If a call originates in the second subgroup, start relay 320 instead of 310 is operated. The function of relay 320 in most respects is similar to that of relay 310 except that at contact 321 test wiper 27 instead of 23 is connected up, namely by way of wiper CB and conductor 34; and that at contact 322 slow-acting switching relay 220 instead of 210 is operated, subsequent to the operation of relays 335 and 330, by way of wiper CB and conductor 36. In this manner, if the call originates in the second subgroup the finder is caused to search and switch the call through over its lower set of banks.

It will now be assumed that relay 340 operates upon the successful seizure of a finder by the allotter but that because of some unstandard condition, this finder fails to find a calling line. In order to enable the calling line to be served in spite of this condition, timer relays 390 and 395 have been provided, together with two time pulse conductors 56, 57 which are controlled from a common timer apparatus not shown. This timer apparatus which may be of any well-known type is arranged to send a short ground pulse over conductor 56 and, shortly thereafter, over conductor 57 in cyclically repeated intervals. The ground pulse on conductor 57 causes relay 390 to operate by way of contacts 349a and 392, lock to ground at 349 by way of contact 393 and at 391 connect the winding of relay 395 to conductor 56 by way of contact 398. When, subsequently, a ground pulse is received over conductor 56 at the end of a timing cycle, relay 395 operates over this conductor, locks to ground at 349 by way of contact 397 and opens the circuit extending over wiper DS and the S conductor at contact 396. As a result relay 360 releases, thereby causing the allotter switch to be "kicked-off" from the faulty finder and advanced in search of another idle finder as described above in connection with the release of the allotter after serving a finder in the regular manner.

Referring to banks DC1 and DC2 of the allotter switch as shown in Fig. 3, it will be noted that the guard conductors of eight first-choice finders are connected to the first eight positions of bank DC1 and those of two second-choice finders to the last two positions of bank DC2, all remaining positions of both banks being grounded. Instead of being connected to a series of successive positions as shown the finders of one class may, however, also be interspersed with finders of the other class in the allotter switch banks. Inasmuch as relay 380 is normally operated and accordingly, wiper DC1 connected up, the allotter normally allots only first-choice finders, that is finders which have each a selector individually associated therewith. If the first-choice finder connected to position 8 of the allotter switch has been served, the allotter switch is automatically advanced over positions 9 and 10 which are grounded in the DC1 bank so that the first-choice finder connected to position 1 is tested next.

When all first-choice finders have been taken into use, all eight multiple grounds are disconnected at contacts such as 218 or 228, from conductor 41 so that relay 380 releases, the release of this relay, however, being prevented, due to a locking circuit extending over contacts 385 and 348, until relay 340 restores upon the release of the allotter after having served one of these finders. At contacts 382, 381 relay 380 in restoring switches the allotted test circuit from wiper DC1 to wiper DC2 so that subsequently only the two second-choice or multipled finders can be taken into use as long as relay 380 remains released.

In order to describe the functioning of the system under an all-first-choice-finders-busy condition it will now be assumed that the line finder, LF, shown in detail in Fig. 2 is a second-choice or multipled finder and that the corresponding wiring is used as indicated in that figure; and it will be further assumed that this finder LF and the other finder, LF', shown in Fig. 2 are connected in multiple by way of trunk conductors 45—49, to the same selector, Fig. 4 and Fig. 5, the aforementioned other finder LF' belonging to another group than finder LF and, accordingly, being served by another allotter as indicated in Fig. 2. As will be seen from this figure similar reference numerals have been used for corresponding parts of finders LF and LF' except that a prime has been added to the reference characters employed in the case of finder LF'. Attention is particularly called to the fact that conductor 39 which, instead of conductor 38, is used as the guard conductor for finder LF if the latter is employed as a second-choice finder, is multipled to the guard conductor, 39', which serves to set up a busy condition in the DC2 bank, not shown, of the allotter serving the finder group including finder LF'. It will also be noted from Fig. 2 that if finder LF is used in multiple with finder LF', the circuit including contacts 218 and 228, instead of being taken directly to conductor 41 and relay 380 is looped through contacts 218' and 228' of finder LF' and, if still other finders are multipled to the same selector, through a chain including corresponding contacts of these other finders, to conductor 42 and from there to relay 370 and, in multiple therewith, to the corresponding relay of the other allotters involved.

The operation of finder LF as a multipled finder is much the same to that described above except that this finder is rendered inaccessible to its alloter, Fig. 3, not only when this finder itself is in use but also when any of the finders multipled thereto, in the assumed example, finder LF′, is in use. More particularly, if finder LF′ is busy, ground on guard conductor 39′ is returned by way of conductor 39 to the ninth contact in the DC2 bank of the allotter, Fig. 3, so that the allotter switch, Fig. 3, steps over this ninth position when engaged in a finder selecting operation with relay 380 released. On the other hand, it will be recalled that the allotters are designed not to seize a tentatively allotted finder, that is, not to cause its guard conductor to be grounded, until a start condition comes up in the allotter. Therefore, a plurality of allotters, such as the one associated with finder LF and the one associated with finder LF′ may idly rest on the respective multiple finders LF and LF′ without disturbing each other. If subsequently one of these allotters is placed in start condition by a call, all other allotters which had thus pre-selected the same selector, are "chased away" due to the commoning of the guard conductors of the second-choice finders involved. For example, ground on conductor 39′ will operate allotter switch magnet 300, Fig. 3, by way of conductor 39, DC2 wiper in position 9, contacts 381, 371, 362, 301, 372, winding of magnet 300, battery and will thus cause this allotter switch to pre-select another finder. In order to guard against the possibility that two allotters that have pre-selected the same selector are placed into start condition at the same time, the battery-checking relays 360 in the allotters have been rendered marginal, that is only one such relay can operate in series with the upper winding of the line relay, 420, of the particular selector at the same time. Thus, ground on the armature spring of contacts such as 361, 362 of the remaining allotters that are attempting to seize this selector, causes the allotter switch magnet to be operated and, accordingly, another idle second-choice finder to be selected.

Due to the chain circuit extending through contacts 218, 228, 218′, 228′ and so on, as soon as one of the finders multipled to the same selector is placed in switch-through condition, a multiple ground is removed from conductor 42. When all commonly-trunked selectors, in the present example the two selectors reached over positions 9 and 10 of the allotter switch, Fig. 3, have been taken into use, conductor 42 is rendered free of ground at its finder end and relay 370 together with the corresponding relays in the other affected allotter is permitted to release. However, as will be seen from Fig. 3, the release of relay 370 is subject to the condition that the respective allotter is no longer engaged in serving a finder so that the locking circuit of relay 370 extending over contacts 373 and 346 to ground at 383 is open at 346, and to the further condition that all-first-choice-finders busy relay 380 is still released so that relay 370 is not held by ground over contact 384. When relay 370 releases it opens the circuits for relay 350 and magnet 300 at contacts 371 and 372, thereby disabling the allotter. If desired, relay 370 could also be provided with a contact, not shown, for operating an all-trunks-busy meter.

Attention is now directed to the spark-protection arrangement shown in Fig. 3 both in connection with allotter switch magnet 300 and finder magnet 230. It will be recalled that both the finder switch and the allotter switch are of the indirect-stepping type wherein each step is taken upon the de-energization of the magnet. In absence-of-ground hunting switches of this type, particularly if they are fast stepping, it frequently happens that the interrupter contact of the magnet re-closes briefly before completion of the final step incident to which the test wiper disengages the last contact of the test bank on which ground is present. This means that on this last step the magnet circuit is opened at the test wiper rather than the interrupter contact of the switch magnet. This may result in damage to the test wiper or bank, particularly in view of the fact that while the interrupter contacts of the switch magnet are usually of precious metal and can easily be designed for heavy duty, this is, as a rule, not the case for the contacts formed by the tip of the test wiper and the contact terminals of the test bank. While such damage to the test wiper and contacts can be minimized by choosing a more effective spark-protecting device for the switch magnet proper there are limits to this expedient which result from the fact that the more effective the spark quenching effectiveness of this device the greater is, as a rule, its slugging or speed-reducing effect on the magnet also. This, of course, is especially objectionable in a switch which is otherwise designed for rapid stepping.

According to one feature of the invention this difficulty is overcome by associating with the magnet interrupter circuit two spark protection devices of different spark quenching effectiveness, the device of lower effectiveness being connected to a point in the interrupter circuit intermediate the interrupter contact and the magnet and that of higher effectiveness being connected to a point between the test wiper on the one hand and the magnet and interrupter contact on the other hand. In this manner, the spark-protection device of higher effectiveness is inoperative during the stepping operation proper of the switch as it is connected to a point of the interrupter circuit which is disconnected from the magnet by the interrupter contact as soon as that contact opens upon each operation of the magnet. However, when the interrupter contact re-closes while the switch takes its last step as described above, the device of higher spark quenching power is effective in protecting the test wiper and contact against damage at the time the interrupter circuit is opened at that point to arrest the switch.

In the embodiment of the invention shown in the drawings the spark-protection device of comparatively low spark quenching capability is a "Thyrite" or silicon-carbide non-linear resistance connected across the switch magnet, this non-linear resistance being represented in Fig. 3 as a rectangle 55 in the case of allotter switch magnet 55 and as a rectangle 51 in the case of finder magnet 230, Fig. 2. This type of resistor exhibits a high resistance to ordinary operating voltages but a low resistance to the high surge voltages set up incident to the interruption of the magnet circuit and thereby acts to dissipate the last-mentioned voltages. The spark-protection device of high quenching effectiveness is a rectifier 54, Fig. 3, in the case of the allotter switch magnet and a rectifier 53, Fig. 3 in the case of the finder switch magnet. These rectifiers are poled so as to normally oppose the flow of direct current therethrough but permit counter-electromotive forces set up in the associated magnet upon opening of the respective interrupter circuit at the respective test wiper and bank to be effectively dissipated therethrough. It has been found that germanium diodes are particularly suitable as rectifiers for this purpose.

*Selector*

Reverting now to the setting up of the connection between subscribers A and B it will be recalled that at the time line finder LF switched the calling line through to the selector, Figs. 4 and 5, relays 420, 430 and 440 were operated therein. Under this condition dial tone is connected to the negative side of the line by way of dial tone conductor 71, condenser 70, contacts 471, 441 and 411. Upon hearing the dial tone the calling subscriber actuates his calling device in accordance with the first digit 2 of the called subscriber's number.

When line relay 420 releases in response to the first impulse of this impulse series it opens the circuit of relay 430 at 421 but due to its slow-release characteristic this relay remains operated throughout this series. At contact 422 the following circuit is closed for selector switch magnet 480: ground, contacts 446, 422, 453, 479*e*, conductor 77, group-selection control wiper 97 in the normal position, 52, of the switch, conductor 87, contact 433, interrupter contact 481, winding of magnet 480, battery. A branch of this circuit extends from conductor 87 by way of contact 477 to the upper winding of change-over relay 440 and battery. The closure of contact 422 of the line relay also causes the operation of auxiliary impulse relay 450 over the following circuit: ground, contacts 446 and 422, lower winding of relay 450, battery. Upon the operation of relay 450 the ground connection including contacts 422 and 446 for the above-traced circuits for magnet 480 and the upper winding of relay 440, is replaced, at make-before-break contacts 454, 453, by a direct ground connection by way of contact 446, whereby the two last-mentioned circuits become independent of impulse contact 422. At contact 452 auxiliary or lock-pulse relay 450 locks to ground encountered by group control wiper 97, namely by way of conductor 87, contacts 433 and 452, resistance 69, upper winding of relay 450, battery.

Magnet 480 operates in the above-traced circuit, simultaneously with or prior to or subsequently to the operation of relay 450, thereby opening its impulse contact 481. As a result, the circuit of magnet 480 is broken, the magnet releases and the switch accordingly is stepped from its normal position 52 to position 1. At this time the circuit of the lower winding of changeover relay 440 is broken at off-normal contact 65 but this relay is held operated in the above-traced circuit extending through its upper winding. Interrupter contact 481 re-closes incident to the afore-mentioned release of magnet 480.

As will be seen from Fig. 5, control conductor 77 is connected not only to contact 52 but also, among others, to contacts 1, 2 and 3 of group control bank GC. Therefore, once relay 450 has operated, ground remains connected to control wiper 97 in each of positions 52, 1, 2 and 3 of the selector switch irrespective of whether or when impulse relay 420 re-operates with the selector switch in any of these positions. Consequently, this switch is advanced in the above manner all the way to position 4 under the sole control of its interrupter contact and, therefore, at a speed governed merely by the time constants of the switch itself, relay 440 remaining operated during this time by way of its upper winding. On the other hand, because of the circuit extending through the lower winding of relay 450, the last-mentioned relay is not permitted to release prior to the re-operation of line relay 420 either. This guards against the possibility that control conductor 78 which, among others, is connected to control contact 4 of the switch, is activated in the manner described hereinafter before line relay 420 begins its second cycle. This safeguard is of importance due to the fact that control conductors 77 and 79 are connected together during the impulse series by way of contact 445 so that if the switch were allowed to step from position 4 to position 5 while relay 450 was still operated, the switch would be immediately further advanced from position 5 and the skipping of switch positions corresponding to trunk group 1, thereby prematurely initiated.

Attention is also called to the fact that the first energization of magnet 480 takes place at the earliest possible moment, namely by way of contact 453 immediately upon the first release of line relay 420, that is even before the operation of auxiliary relay 450. Moreover, should the switch for some reason be slow in taking its first or any of the following three steps, proper advancement of the switch is insured by virtue of the locking circuit through the upper winding of relay 450, provided only that this locking circuit is opened in position 5 of the switch and relay 450 restored before the line relay releases again in response to the following impulse. In this way proper group selection is obtained even though the switch, within certain limits, is fast or slow as compared with the dial pulses. In this connection it is pointed out that the stepping switches used herein normally advance their wipers at a rate of roughly 75 per steps per second when operated in a self-interrupting circuit so that, assuming a dial of ten impulses per second the switch is capable of taking approximately 7.5 steps between any two impulses of the group selecting series. Inasmuch as the switches in the embodiments described herein are required to skip only five positions, that is take only five steps, in the time between two impulses, the switches are under ordinary conditions well able to keep up with the dial pulses. The foregoing reduction of the number of positions to be skipped per numerical impulse to only five positions is obtained herein by the above-mentioned staggered arrangement of the odd and even trunk groups according to the principles of the above-cited patent application by C. W. Frank.

When relay 450 releases subsequent to both the re-operation of line relay 420 and the advancement of the switch into its fourth position, ground is connected to control conductor 78 and, hence, the fourth contact in control bank GC, by way of contacts 446, 455 and 479*b*. The switch is thus stepped from position 4 to position 5 which is the first or start position of trunk group 1. It will be noted that the advance of the switch to this position in response to the first numerical pulse took place over positions, namely 52, 1, 2, 3 and 4 to which trunks of groups 9 and 10 are connected. Since changeover relay 440 was energized upon seizure of the switch and remained energized during the above-mentioned advancement, none of these trunks can be effectively reached by dialling 1 or by not dialling at all.

In the present instance it was assumed that the digit dialled into the selector is a 2. Therefore, when line relay 420 again releases at the beginning of the second impulse, magnet 480 is immediately energized in the following circuit: ground, contacts 446, 422, 453, 479*e*, 445, conductor 79, wiper 97 in position 5, conductor 87, contacts 433 and 481, magnet 480, battery. Again relay 440 is held over its upper winding in parallel with the switch magnet, and relay 450 operates by way of impulse contact 422 and the lower winding of relay 450, whereby this relay is locked to the GC wiper and control conductor 79 transferred, at make-before-break contacts 454, 453 from ground through impulse contact 422 to ground directly through contact 446. Since control conductor 79 is multipled to the GC bank contacts in positions 5 through 8, the switch is at once advanced into position 9 under the control of its interrupter contact 481.

In this position the locking circuit through the upper winding of relay 450 is opened so that this relay releases provided line relay 420 has re-operated in the meantime. The switch magnet is now energized in a circuit including contacts 446, 455, 479, 467, control conductor 80 and GC wiper 97 in position 9 so that the switch is automatically advanced into position 10. Due to the overlapping way in which the even and odd trunk groups are connected to the two sets of selector banks respectively, position 10 is the first or start position for group 2.

As there are no further impulses in the digit, no further energization of a control conductor such as 77 takes place with the switch in position 10 so that relay 440 releases with a slight delay. Relay 440, in releasing, at contact 441 opens the dial tone circuit, at contact 445 removes the above-mentioned coupling between control conductors 77 and 79, and at contacts 444 and 447 closes an operating circuit traced below for either relay 460 or 470 as the case may be. Conductors 77 and 79 are separated from each other at contact 445 at this time to facilitate the selective operation of wiper selecting relay 460 depending on whether control wiper GC has come to a rest in the start position of an even or an odd numbered trunk group. As will be seen from Figs. 4 and 5 the upper winding of relay 460 is connected up by way of control conductor 77 if the switch has been set on the start position of an even numbered group as in the instant example; and the upper winding of relay 470 is connected up by way of control conductor 79 if the switch has been set on the start position of an odd numbered group, but in the first-mentioned case both relays 460 and 470 are caused to operate because of the energization of the lower winding of relay 470 through contact 469*a* of relay 460 as set out in greater detail hereafter. Relay 460 when operated serves to transfer various circuits from the upper or odd set of wipers to the lower or even set of wipers. When an odd digit has been dialed and accordingly, relay 470 alone is operated, the three control conductors 77, 79 and 80 are effectively connected together, namely by way of contact 479*f* and contacts 479*a*, 467, and to the odd test wiper while conductor 78 is left dead, whereby the subsequent trunk-hunting movement of the switch is extended, if necessary over all trunks of the selected odd group but no further; and when an even digit has been dialled and, therefore, both relays 460 and 470 are operated, the three control conductors 77, 79 and 78 are effectively connected together, namely by way of contact 479*f* and contacts 479*a*, 468, and to the even test wiper while conductor 80 is left dead, whereby the ensueing trunk-hunting operation of the switch is permitted to extend over all trunks of the selected even group but no further.

It may further be mentioned at this point that, in accordance with the restricted service arrangement disclosed herein and more particularly explained below, the operation of relays 460 and 470 is made dependent on the availability of ground at a point in the circuit corresponding to the break spring of contact 474. Assuming that trunk group 2 is a non-restricted group, ground is connected to contact 10 in the special control bank SC of all selectors of the group including the present selector, Fig. 5, in multiple so that the following circuit for relay 460 is closed upon the release of changeover relay 440: ground, SC wiper 98 in position 10, conductor 88, contact 449, rectifier 75, contacts 474, 415, 465, 444, 417, 434, 447, upper winding of relay 460, control conductor 77, GC wiper 97 in position 10, conductor 87, contact 433, interrupter contact 481, magnet 480, battery. Due to the relatively high resistance of the upper winding of relay 460, only the last-mentioned relay operates in this circuit.

Relay 460, in operating, at its contacts 461, 462; 463, 464; and 465, 466 effects the above-mentioned transfer from the odd to the even switch wipers; at 467 disconnects conductor 80 and at 468 connects up conductor 78; at 469 closes a locking circuit for itself extending from ground at contact 432 by way of contact 469 to its lower winding and battery; and at 469*a* completes the following circuit for relay 470: ground, contacts 432, 419*b*, 469*a*, lower winding of relay 470, battery. Relay 470 upon its operation, at 479*h* locks independently of contact 469*a*; at contact 479*g* short-circuits its upper winding; at contacts 479*a* couples control conductors 77 and 78 together by way of contact 468; at contact 479*f* additionally couples conductor 79 to conductor 77, thereby connecting magnet 480 to even test wiper 93 over a circuit path extending from that wiper by way of conductor 83, contacts 466, 444, 417, 434, 447, 479*g*, 479*f*, conductor 77, GC wiper 97 in position 10, conductor 87, contact 433, interrupter contact 481, magnet 480, battery; at contact 479*d* connects switching relay 410 in series with the switch magnet in a circuit extending from ground through contact 432, winding of relay 410, contacts 479*d*, 434, 447, 479*g*, 479*f*, conductor 77, wiper 97 in position 10, conductor 87, contacts 433 and 481, magnet 480, battery, the junction between relay 410 and magnet 480 as represented by contact 479*d* thus being connected to even test wiper 93; and at contact 478 connects the upper winding of relay 450 to conductor 87, thereby placing this winding in parallel with magnet 80.

The subsequent operation of the circuit depends on the busy or idle condition of the individual trunks of group 2. Assuming that the first trunk of this group which is connected to position 10 is busy, ground on the corresponding test conductor operates magnet 480 by way of the above-traced circuit extending over the even test bank and wiper 93 and the group control bank and wiper 97 in series. As this same ground appears at the right-hand terminal of switching relay 410, this relay cannot operate due to being short-circuited. Magnet 480, in operating, breaks its own circuit by opening its interrupter contact 481 whereby the switch is advanced into position 11. Assuming that the second trunk of group 2 which is connected to this position is idle, ground is absent from the corresponding test conductor and accordingly switching relay 410 is permitted to operate in series with magnet 480 in the circuit traced above. Due to the comparatively high resistance of the winding of relay 410, magnet 480 cannot operate in this circuit.

Switching relay 410, in operating, at 411 and 413 disconnects the windings of line relay 420; at 412 and 414 switches the talking conductors through; at 417 disables the trunk-hunting circuit; at 418 and 419*a* prepares a holding circuit for relay 410; and at 419*b* opens the locking circuit for relay 470. Due to the switching through of the talking conductors at 412, 414 the calling subscriber's loop is now further extended over incoming talking conductors 45 and 46, contacts 412 and 414, contacts 462 and 464, conductors 81 and 82, even talking wipers 91 and 92 in position 11, trunk conductors 151 and 152, contacts 612 and 613, Fig. 6, upper and lower winding of connector line relay 620 to battery and ground respectively. Relay 620, in operating, at 621 causes the operation of connector hold relay 630 over an obvious circuit, and the operation of this last-mentioned relay, at 634 causes holding ground to be returned to the selector by way of test conductor 153.

In the selector, Fig. 4, relay 470 releases due to the opening of its locking circuit at 419*b*. Relay 470, upon releasing, at contacts 479*d*, 479*g* and 479*f* disconnects the right-hand terminal of switching relay 410 from the various control conductors and, hence, from group control wiper 97, and at 478 permits relay 450 to restore. Line relay 420 also releases due to the above-mentioned disconnection of its windings, thereby, at its contact 421 permitting hold relay 430 to release with a slight delay. At this point switching relay 410 is held in a circuit extending from the above-mentioned holding ground on connector test conductor 153 by way of test wiper 93 in position 11, conductor 83, contacts 466, 444, 418, winding of relay 410, contacts 419*a*, 68, 451, 481, magnet 480, battery. This same ground holds wiper switching relay 460 by way of its contact 469, and also holds the finder and line circuit by way of incoming conductor 47.

Before proceeding with the description of the setting up of the connection to subscriber B, the functioning of the selector, Figs. 4 and 5, under various other conditions will first be described. Let it first be assumed that the second trunk group has been selected as above described but that all ten trunks of this group are busy. Under this condition, the above described automatic stepping operation of the selector switch will continue up to position 14 due to ground being maintained on control conductor 77 by way of even test wiper 93. Moreover, inasmuch as control conductors 78 and 79 are also connected to that test wiper in multiple with conductor 77, the switch will further be stepped from position 14 to position 15 and then from position 15 all the way to position 19 to which the last trunk of group 2 is connected. However, even though this tenth trunk is also assumed to be busy and ground, accordingly, encountered by test wiper 93 in position 19, no further operation of switch magnet 480 can take place because control conductor 80 which is connected to the group control bank in this position, is not connected to test wiper 93 but has been left dead. As a result the circuit of the upper winding of relay 450 which extends during the trunk-hunting operation to the GC wiper by way of contact 478 and conductor 87, is broken in position 19 and this relay accordingly permitted to release. This results in the renewed operation of relay 440, namely in a circuit which may be traced from ground on test wiper 93 by way of conductor 83, contacts 466, 444, 417, 434, 455, 479*c* and the upper winding of relay 440 to battery. Relay 440, upon operating, at 443 and 446 places itself in a local locking circuit extending from ground at contact 446 through contacts 434, 417, 443 and 476 and through the upper winding of relay 440 to battery; and at 441 connects busy tone to the calling end of the connection, namely by way of busy tone conductor 73, condenser 72, contacts 472, 441 and 411 and negative talking conductor 45.

Upon hearing the busy tone the calling subscriber at substation A replaces his handset so that relays 420 and 430 release in this order. Relay 430, in restoring, at contact 432 removes holding ground from incoming test conductor 47 so that switching relay 210 in finder LF, Fig. 2, and cut-off relay 110 in the line circuit are permitted to restore and these two circuits accordingly returned to normal condition. In the selector, removal of ground at contact 432 opens the locking circuit of relays 460 and 470 so that these two relays restore; and relay 440 releases with a slight delay due to the opening of its locking circuit at contacts 476 and 434. During the release time of relay 440 the following circuit is closed for the overflow meter associated with group 2: ground, contacts 446, 435, 448, conductor 88, special control wiper 98 in position 19, conductor B2, overflow meter, not shown, battery. The following homing circuit it now closed for the selector magnet: ground, contacts 431, 419, 68, 451, interrupter contact 481, winding of magnet 480, battery. As a result, the wipers of the switch are automatically advanced until the self-interrupter circuit for magnet 480 is disabled by the opening of off-normal contact 68 in the normal position, 52, of the switch. At this time the incoming S conductor 49 is reconnected at off-normal contact 66 to the upper winding of line relay 420 and battery and the selector, thereby, rendered available again to the allotter, Fig. 3.

Assuming now that an odd numbered group, for example 3, has been selected instead of an even numbered group, group control wiper 97 will have been set at the end of a digit on a contact, in the present example contact 15 to which control conductor 79 rather than 77 is connected. Consequently, the circuit through the upper winding of odd to even switching relay 460 cannot be completed and this relay accordingly remains unoperated, and relay 470 alone is operated incident to the release of changeover relay 440, namely by way of its upper winding. Assuming that group 3 also is a non-restricted group, the corresponding circuit may be traced from ground on contact 15 of the special control bank, wiper 98, conductor 88, contact 449, rectifier 75, contacts 474, 415, 465, 444, 417, 434, 447, upper winding of relay 470, control conductor 79, GC wiper 97 in position 15, conductor 87, contacts 433 and 481, winding of magnet 480, battery. Relay 470, upon operating, at 479*h* completes its locking circuit as before; at 479*g* short-circuits its upper winding; at 479*f* couples control conductors 77 and 79 together, thereby at the same time short-circuiting the upper winding of relay 460 by way of contact 479*g*; and at contact 479*a* additionally coupling control conductor 80 to control conductor 77, namely by way of contact 467 while control conductor 78 remains disconnected at contact 468 of relay 460. Furthermore, with relay 470 operated and relay 460 unoperated, the three multipled control conductors 77, 79 and 80 are now connected to odd test wiper 96, namely by way of conductor 86 and contacts 475, 415, 465, 444, 417, 434, 447 and 479*g*; and they are also connected to the right-hand terminal of the winding of relay 410, namely through contact 479*d*. As a result the testing and, if necessary, trunk-hunting operation takes place substantially as above described; and when an idle trunk in group 3 has been found switching relay 410 operates as before in series with magnet 480 the locking circuit of relay 410 in the present case extending from holding ground on the corresponding connector test conductor via odd test wiper 96, conductor 86, contacts 416, 465, 444 and 418, winding of relay 410 and thence to battery as described above in connection with group 2.

Assuming that all trunks in group 3 are busy, magnet 480 is operated in positions 15—18 by way of control conductor 79; in position 19 by way of control conductor 80; and in positions 20—24 by way of control conductor 77. Since control conductor 78 has been left dead no further energization of magnet 480 can occur in position 24 so that the trunk-hunting movement in the present case too, has been extended over the ten trunks of the selected group but not beyond, this being accomplished by carrying the stepping circuit for the switch magnet over the GC wiper during the trunk-hunting operation in the manner just explained. In addition, this wiper serves for the group-skipping control proper and also serves for the selective operation of the wiper switching means, all as described in detail hereinbefore.

The operation of the switch in case an even numbered group other than 2 or an odd numbered group other than 3 is dialled is similar to that explained above, both relays 460 and 470 operating at the end of all even digits and relay 470 operating alone on all odd digits. If the digit dialled is a 9 the switch stands in position 45 which is the start position for group 9; and because of the wiring of the GC bank as shown in Fig. 5 and due to the fact that when the lower wiper of each pair disengages the associated lower bank the upper wiper of each pair is moved into engagement with the associated upper bank, the trunk-hunting movement in this case first extends over positions 45—52 and subsequently, if required over the initial switch positions 1, 2, 3, and 4 to which the last four trunks of group 9 are connected. Similarly, if the digit dialled is a 10, the switch at the end of the digit has assumed position 50 which is the start position for group 10; and in this last-mentioned case the trunk-hunting operation extends first over positions 50, 51 and 52 and then, if necessary, over positions 1—9.

Assuming that trunk group 10 leads to another office it may be desirable to bar non-privileged subscribers from access to this trunk group. In accordance with the restricted service arrangement employed herein, ground is removed in special control bank SC from the start position of restricted groups, such as group 10. Furthermore, ground is removed from the EC conductor in the line circuit of restricted, that is non-privileged subscribers as shown in Fig. 1. This means that when changeover relay 440 releases at the end of the first digit ground will be available at the point of the selector circuit corresponding to the break spring of contact 474 if either the selected group is a non-restricted group or the call has been initiated by a non-restricted subscriber or both. Assuming, for example, that a restricted group such as 10 has been selected but that the calling party is a privileged party then, although ground is not strapped to the special control bank SC in the start position of the corresponding group, ground is still available for the energization of the upper winding of relay 460, or 470 as the case may be, over the following circuit path: ground, EC conductor 16, Fig. 1, ECl wiper 24 of finder LF, Fig. 2, contact 214, incoming EC conductor 48 of the selector, Fig. 3, contact 474 and thence through the upper winding of relay 460 or 470 to battery at magnet 480 over the circuit path traced hereinabove. However, if both of these ground connections are concurrently absent from the break spring of contact 474, that is, if both the selected group and the calling subscriber are restricted no circuit can be completed through the upper winding of relay 460 or 470 upon the release of changeover relay 440. As a result both test wipers, 93 and 96, remain disconnected at contacts 466 and 475 respectively, no automatic stepping circuit for magnet 480 for the purposes of trunk-hunting can be closed and busy tone is transmitted to the calling party over a circuit path including busy tone conductor 73, condenser 72, contacts 473, 442, 67 and 411 and negative talking conductor 45. When the calling party thereupon replaces his handset, relays 420 and 430 release in this order, finder LF, Fig. 2, and the line circuit, Fig. 1 are freed by the removal of holding ground from conductor 47 at 432, and at 431 the above traced automatic homing circuit is completed for selector switch magnet 480. When the switch has reached its normal position, the off-normal contacts are actuated as described and the selector thus rendered available again for other calls.

The spark protection arrangement for the selector switch magnet is similar to that shown in Fig. 3 for the spark protection of the finder and allotter magnets. It includes a silicon-carbon non-linear resistor 76 and a germanium diode 74.

*Connector*

Turning now to the connector, Figs. 6 and 7, it will be clear from an inspection of the lower portion of Fig. 7 that the group control bank GC of this switch also has four control conductors, 175—178, wired thereto. This wiring differs from that used for the selector switch, Fig. 5, in that the control bank contacts in the start positions 5, 15, 25 etc. of odd numbered groups have been separately connected to one control conductor, 177, and the control bank contacts in the start positions 10, 20, 30 etc. of even numbered groups have been separately connected to another control conductor, 178, each of these start positions being one step in back of the first line of the corresponding group. The GC contacts preceding these start positions both of the odd and even numbered groups, that is, contacts 4, 9, 14, 19 etc. have all been multipled to another control conductor, 176, and all other contacts of the GC bank with the exception of contacts 50 and 51 which require no wiring, have been connected to the remaining control conductor, 175. These differences in the wiring of the group control bank reflect, among others, the fact that the connector, according to the embodiment of Figs. 6 and 7, contrary to the selector is not arranged for trunk-hunting so that the group control bank need not be wired with a view to limiting tthe trunk-hunting operation to the positions corresponding to the selected groups of outlets.

During the group-selecting movement of the connector all contacts of the group control bank except those in the positions preceding the group start positions, are multipled together as in the case of the selector. In the connector this is accomplished by means of relay 660 which is operated during the tens digit and at its contacts 663 and 665 couples control conductors 175, 177 and 178 together. At the end of the units digit relay 660 releases, thereby opening this multiple connection to connect control conductor 177, at 666, to the upper winding of relay 600 and control conductor 178, at 664, to the upper winding of relay 690. These two relays have a function similar to that of relays 460 and 470 respectively except that in the case of the connector the even wipers are normally connected up so that relay 600 is an even to odd wiper switching relay. Relay 680 is a lock pulse relay similar to relay 450 in the selector.

At the time the selector, Figs. 4, 5 switches through to the connector, relays 620 and 630 operate as above described. At its contact 634 relay 630, in addition to returning holding ground to the selector, causes the operation of relays 625 and 660 by way of off-normal contact 162 and the lower and upper winding respectively of these two relays. When relay 625 operates it completes a locking circuit for relay 660 extending from ground at contact 635 through contact 628 and the lower winding of relay 660 to battery; and relay 660, upon operating, at contacts 663 and 665 couples control conductors 175, 177 and 178 together as mentioned above.

The calling subscriber now actuates his calling device in accordance with the second digit, 3, of the called subscriber's number which is the tens digit of his directory number 237. Upon each release of line relay 620 of the connector during the receipt of the tens digit and also, subsequently, the units digit, the circuit of relay 630 is opened at contact 621 but relay 630 stays operated during each of these series of impulses by virtue of its slow-release-characteristic. When impulse contact 622 closes upon the first release of relay 620 responsive to the receipt of the first impulse of the tens digit the following circuit is closed to connector switch magnet 655: ground, contacts 622, 633, 627, 683, control conductor 175, GC wiper 192 in normal position 52 of the connector switch, conductor 172, contact 632, interrupter contact 656, contact 694, magnet 655, battery. A branch of this circuit extends through the upper winding of relay 625 to battery and another branch through the lower winding of relay 680 to battery. Relay 680, in operating, at contact 682 locks to ground encountered by the GC wiper, namely by way of contact 697 and conductor 172, in parallel with magnet 655; and at make-before-break contact 684, 683 transfers control conductor 175 from ground at impulse contact 622 to ground at contact 635 of hold relay 630.

Magnet 655 in operating, by way of contact 683 or 684, breaks its operating circuit at 656 so that the switch is advanced from position 52 to position 1. As contacts 1, 2 and 3 of the group control bank are also connected to conductor 175, the switch is thus automatically advanced until it reaches position 4. When the switch steps off position 3 the above locking circuit through the upper winding of relay 680 is broken and relay 680 releases provided that line relay 620 has re-operated in the meantime, thereby opening the circuit through the lower winding of relay 680. The release of relay 680 now permits the switch magnet to be operated by way of conductor 176, namely in the following circuit: ground, contacts 635, 685, conductor 176, GC wiper 192 in position 4, conductor 172, contacts 632, 656, 694, magnet 655, battery. Due to the action of interrupter contact 656 the switch is, therefore, advanced into position 5. This position is one step in back of the one accommodating the first line of group 1 and therefore, constitutes the start position for this group. At the time the switch was stepped into position 1, the circuit through the lower winding of relay 625 was opened at off-normal contact 162 but, due to its slow-release characteristic, relay 625 is held operated throughout the impulse series by means of its upper winding.

When line relay 620 releases in response to the second impulse of the tens digit, magnet 655 is operated by way of conductor 177 and wiper 192 in position 5, since conductor 177 is coupled to conductor 175 through contact 665 of relay 660. Again lock pulse relay 680 operates through its lower winding in parallel with the switch magnet locks through contact 682 and its upper winding to ground encountered by wiper 192 and transfers, at 684, 683 the multiple connection of the three control conductors 175, 177 and 178 from ground through impulse contact 622 to ground at contact 635. Since contacts 6—8 of the GC bank are all connected to conductor 175, the switch is thus advanced all the way to position 9 regardless of a change of condition of line rely 620 during such advancement. With the switch in position 9 and the line relay re-operated the circuits of both windings of relay 680 are broken and this relay, in restoring, at its contact 685 steps the switch into position 10 which is the start position for group 2. The third and last impulse of the tens digit causes the switch, in a similar manner, to be advanced into position 15 which serves as the start position for group 3.

When relay 625 releases upon the re-operation of relay 620 at the end of the tens digit it permits, at contact 628, relay 660 to restore with a slight delay. Relay 660 in releasing, at contacts 663 and 665 breaks the above-mentioned multiple connection between conductors 175, 177 and 178, and connecting conductor 177, at 666 to the upper winding of relay 600 and connecting conductor 178, at 664 to the upper winding of relay 690 as mentioned above. The following circuit is now closed for the upper winding of relay 600: ground, upper winding of relay 600, contact 666, conductor 177, GC wiper 192 in position 15, conductor 172, contacts 632, 656, 694, magnet 655, battery. Due to the comparatively high resistance of the upper winding of relay 600 only this relay operates in this circuit. At its preliminary or "X" contact, relay 600 locks to ground at contact 635; at contacts 601, 602; 603, 604; and 605, 606 it transfers the talking and test conductors of the connector from the even to the odd set of wipers; and at 607 causes the operation of relay 690 in a circuit extending from ground through contacts 635 and 607 and the lower winding of relay 690 to battery.

Relay 690, upon operating, at its preliminiary or "X" contact 699 locks independently of contact 607; at contact 694 opens a point in the self-interrupting circuit of magnet 655; at contact 695 connects magnet 655 in parallel with the lower winding of relay 680 directly, that is independently of the GC wiper and bank and of interrupter contact 656; and at contacts 696 and 698 closes circuits to the lower winding of relay 625 and the upper winding of relay 660 in parallel. These circuits may be traced as follows: ground, closed off-normal contact 161, contacts 676, 698, 681, 696, and thence through the lower winding of relay 625 to battery and, in multiple thereto, through the upper winding of relay 660 to battery. Both relays accordingly re-operate. Relay 625 in operating, at 628 re-closes the above-traced locking circuit for relay 660, at 629 opens a point in the operating circuit of slow-to-operate switching relay 670, and at 626 opens a point in the operating circuit of busy relay 650; and relay 660, upon operating, at 661 opens another point in the operating circuit of relay 670 and at 662 closes a point in the circuit of busy relay 650.

The subscriber at substation now actuates his dial in accordance with the last or units digit 7 of the called party's number. Each time line relay 620 restores during this digit, magnet 655 is actuated over the following impulse circuit: ground, contacts 622, 633, 627, 695, winding of magnet 655, battery, and the upper winding of relay 625 and the lower winding of relay 680 are energized in parallel therewith. Relay 680 operates responsive to the first impulse of the units digit, at 681 opening the above traced circuits for the lower winding of relay 625 and the upper winding of relay 660 and at 682 closing a locking circuit for itself extending from ground through contacts 161, 676, 698 and 682 and the upper winding of relay 680 to battery. Relay 625, because of its slow-release characteristic, remains operated throughout the impulse series in spite of the intermittent de-energizations of its upper winding at impulse contact 622.

In response to the seven impulses of the units digit the connector switch is advanced, by means of the last-mentioned impulse circuit, from position 15 to position 22 to which line 199 of substation B is connected as shown in Fig. 7. When relay 625 releases at the end of the digit due to the circuit through its upper winding being held open at contact 622, it opens at 628 the locking circuit of relay 660 and at 626 connects busy relay 650 to odd test wiper 191.

Assuming first that the called line is idle, battery rather than ground is encountered by test wiper 191 and busy relay 650 cannot operate. Relay 660, upon releasing after a short interval, at 662 disconnects test wiper 191 from busy relay 650 and completes the following circuit for switching relay 670: ground, contacts 635 and 629, upper winding of relay 670, contacts 654, 661, 693 and 606, conductor 171, test wiper 191 in position 22, test conductor 197 and hence through a contact in the line circuit of sub-station B similar to contact 124, Fig. 1, and the winding of the associated cut-off relay similar to relay 110, Fig. 1 to battery. The cut-off relay in operating in this circuit clears the line of attachments. When relay 670 operates it locks independently of the test wiper in a circuit extending from ground through contacts 635, 629, preliminary or "X" contact 673, lower winding of relay 670, to battery; at 675 relay 670 closes a direct locking circuit for the line cut-off relay from ground at contact 635 through contacts 629, 675, 693 and 606, conductor 171 and test wiper 191; at 676 permits relay 680 to release; at 677 starts the ringing machine by way of contact 648 and ringing machine start conductor 165, in the well known manner; at 671 connects a ring-back tone to the calling end of the connection by way of ring-back tone conductor 159, contacts 671 and 692, condenser 156, contact 642, condenser 154 and negative line conductor 151 whereby the calling subscriber is advised that the called party is being rung; and at 672, 674 completes the following ringing circuit: battery-connected ringing generator, not shown, conductor 160, upper winding of ring cut-off relay 640, contacts 641, 672, 602, conductor 169, negative line wiper 189 in position 22, conductor 195 of the subscriber's line, ringer and condenser, not shown, at substation B, conductor 196 of the subscriber's line, positive line wiper 190 in position 22, conductor 170, contacts 604, 674 and 646, ground. Relay 640 does not operate with only the ringing current flowing through its upper winding.

When the party at substation B hears his bell being rung he answers the call by lifting his handset from the cradle. This completes a direct current loop, from ground at contact 646 to battery at the ringing generator by way of the closed switch-hook contacts, not shown, at substation B, and as a result ring cut-off relay 640 operates by way of its upper winding. Relay 640, in operating, at its preliminary or "X" contact locks in a circuit extending from ground through contacts 635, 629 and 644 and the lower winding of relay 640 to battery; at contact 648 opens the ringing machine start circuit; at contacts 641 and 646 opens the above-traced ringing circuit; at contact 642 disconnects the ring-back tone; and at contacts 643 and 645 switches the incoming line conductors 151 and 152 through to the called subscriber's line 199, namely by way of condensers 154 and 155, contacts 643 and 645, contacts 672 and 674, contacts 602 and 604, conductors 169 and 170 and line wipers 189 and 190 in position 22. The closure of contacts 643, 645 also causes the operation of the back-bridge relay 610 over the called subscriber's loop.

The conversation between subscribers A and B can now commence, the calling party receiving transmission battery through the two windings of relay 620 and the called party through the two windings of relay 610. When relay 610 operates as just described it reverses the polarity of the battery-feed to the calling end of the connection for purposes of answering supervision or metering in the well known manner but in the present embodiment no use is made of these services and, accordingly, no means responsive to this polarity reversal have been shown.

Assuming that the calling party is the first to replace his receiver at the end of the conversation, line relay 620, thereby permitting hold relay 630 to restore. The connector is held for the time being since, although contact 635 opens upon the release of relay 630, relays 600, 690, 640 and 670 are held over an alternative ground connection which holds these relays operated by way of contacts 677, 647 and 616. Under this condition ground is connected, by way of contacts 636 and 615 to Supy-2 conductor 164 which may lead to a battery-connected supervisory lamp, not shown, in the well known manner. The lighting of this lamp indicates to the office personnel that a connector is being held because of the failure of a called party to disconnect.

When the called party, subsequently, disconnects also, relay 610, in releasing, at contact 615 extinguishes the afore-mentioned supervisory lamp, and at contact 616 opens the locking circuit of relays 600, 690, 640 and 670 so that these four relays restore. At contact 676 the following homing circuit is now closed for the connector switch magnet: ground, off-normal contact 161, contacts 676, 631, interrupter contact 656, contact 694, winding of magnet 655, battery. The wipers of the switch are accordingly advanced until the homing circuit is disabled by the opening of contact 161 in the normal position of the switch. With ground removed from hold conductor 153 both at contact 634 of relay 630 and at connector off-normal contact 162*a*, switching relay 410 and wiper selecting relay 460 in the selector are permitted to restore, and the line finder, Fig. 2, and line circuit, Fig. 1 also are freed. Relay 410, Fig. 4, in releasing, at 419 closes the above traced homing circuit for the selector switch, and this switch is made available for other calls as soon as its off-normal contacts are actuated upon the switch reaching its normal condition.

If the called party, B, is the first to replace his handset at the termination of the call, the release of backbridge relay 610, at 617, causes ground to be connected through contacts 677 and 647 to Supy-1 conductor 163. The lighting of another supervisory lamp similar to that mentioned above but connected to conductor 163, advise the maintenance personnel that a connector is being held by a calling party. Subsequently, when the calling party, A, also disconnects, line relay 620 releases, permitting relay 630 to restore. Since the above-mentioned alternative ground connection is open at contact 616, the opening of contact 635 causes the locking circuits of relays 600, 690, 640 and 670 to be opened so that these relays restore. At contacts 647 and 677 each a point in the circuit for the last-mentioned supervisory lamp is opened so that this lamp is extinguished. At contact 676 the above-traced homing circuit for the connector switch is closed and this switch accordingly advanced to its home position as described above. When ground is removed at off-normal contact 162*a*, from hold conductor 153, the selector, line finder and calling line circuit are freed as described above.

In the above description it was assumed that at the time relay 625 released at the end of the units digit, the called subscriber's line was idle. If, on the other hand, this line is busy in either an incoming or outgoing call, ground is connected to test conductor 197 and accordingly busy relay 650 operates during the release time of relay 660, in a circuit extending from ground on conductor 197, by way of test wiper 191 in position 22, conductor 171, contacts 606, 693, 662, 626, 652, winding of relay 650, battery. Relay 650, in operating at 653 locks to ground through contacts 635 and 629, independently of the condition of relay 660; at 652 opens its operating circuit; at 654 opens a point in the operating circuit of relay 670; and at 651 connects busy tone to the calling end of the connection by way of conductor 157, contacts 651 and 692, condenser 156, contacts 642, condenser 154 and negative line conductor 151.

Upon hearing the busy signal the calling subscriber replaces his receiver so that relays 620 and 630 restore. Relay 630, in releasing, and at contact 635 permits relays 600, 690 and 650 to restore. Relay 690, in releasing, at 694 completes the above-traced homing circuit. When the switch has reached its home position the opening of contact 162*a* frees the selector, the finder and the calling line circuit.

Having thus described the operation of the connector switch in extending a connection to a line in tens group 3 which is an odd numbered group consideration shall briefly be given to the operation of this switch if an even tens digit such as 4 has been dialled. If the tens digit contains 4 instead of 3 impulses, the switch is further advanced, in response to the additional impulse of the tens series, from position 15 to position 20, this being the start position for tens group 4. When relays 625 and 660 restore at the end of the digit a circuit is closed for the upper winding of relay 690 rather than 600, this circuit extending from ground through the upper winding of relay 690, by way of contact 664, conductor 178 and GC wiper 192 in position 20 and thence to battery at magnet 655 over the circuit path described above. Relay 690 again locks through its contact 699 and performs the other functions described hereinbefore but since relay 600 is not operated in the present instance, the even set of wipers remains connected up so that the switch, in response to the units digit, is now set on a line in group 4.

Other odd or even groups are reached in a similar manner except that in the case of group 9 lines 8–10 of this group and in the case of group 10 lines 3–10 of the last-mentioned group are re-engaged by the upper wipers of each pair after the switch has executed a complete revolution.

The spark protection arrangement in the connector again is similar to that used for the remaining switches disclosed herein except that, in the case of the connector, Fig. 6, a conventional condenser-resistance combination 173, 173*a* has been shown as the spark quenching device of lower effectiveness, instead of a "Thyrite" resistor. In addition, a rectifier 174, is used as the device of higher spark quenching capability, as in connection with the other switches.

While only certain embodiments of the invention have been illustrated and described, it is to be understood that numerous modifications in the details of arrangement may be resorted to without departing from the true spirit and scope of the invention as defined in the appended claims.

What is claimed is:

1. In a telephone system, a switch of the absence of ground hunting type having wiper and bank means including test wiper and bank means and magnet means for actuating said wiper means, means for marking predetermined positions of said switch by the absence of ground and the presence of battery on said test bank means in said positions, a test relay for said switch, said test wiper means being connected both to said test relay and said magnet so that said test relay remains shunted and said magnet means activated for advancing said wiper means as long as ground is encountered by said wiper means, said test relay operating incident to said test wiper means ceasing to encounter ground, and control means for causing said test bank means to be checked for the presence of battery in the position reached, the condition of said control means being changed responsive to the operation of said test relay for making the above-mentioned connection of said test relay ineffective and placing said relay in a holding connection depending on battery being encountered by said test wiper means, the subsequent release of said test relay if battery is absent from the test bank means in said position causing the magnet means to be re-activated and the connection of said test relay with said magnet means and said test wiper means subsequently to be rendered effective again, whereby the absence of ground hunting action of said switch is resumed in the following position of said switch.

2. In a telephone system, a hunting switch having a number of wipers and banks including a test wiper and bank and magnet means for actuating said wipers, means for marking predetermined contacts of said bank by the absence of ground and presence of battery, a ground-connected test relay for said switch, said magnet means being battery-connected, said test relay being connected in series with said magnet means and the junction of said magnet means and relay connected to said test wiper, said test relay remaining shunted and said magnet means activated for advancing said wipers as long as ground is encountered by said test wiper, and said test relay operating incident to said test wiper ceasing to encounter ground, and auxiliary relay means for causing the test bank contact reached to be checked for the presence of battery, said auxiliary relay means being actuated responsive to the operation of said test relay for transferring said test relay from the above-mentioned connection with said magnet into a holding-connection depending on battery encountered by said test wiper, the release of said test relay subsequent to said transfer, if battery is absent from said test bank contact, causing another circuit to be closed to said magnet means, and the restoration of said auxiliary relay means incident to the release of said test relay causing the last-mentioned circuit to be re-opened and said test relay to be transferred back into the above-mentioned connection with said magnet means and said test wiper, whereby said wipers are advanced to the following position and the hunting action of said switch resumed in said position.

3. In a telephone system, a hunting switch having a number of wipers and banks including a test wiper and bank, magnet means for actuating said wipers and slow-acting means for causing the wipers of said switch to be switched through, means for marking predetermined contacts of said bank by the absence of ground and presence of battery, a ground-connected test relay for said switch, said magnet means being battery-connected, said test relay being connected in series with said magnet means and the junction of said magnet means and relay connected to said test wiper, said test relay remaining shunted and said magnet means activated for advancing said wipers as long as ground is encountered by said test wiper, and said test relay operating incident to said test wiper ceasing to encounter ground, and control means for causing the test bank contact reached to be checked for the presence of battery, the condition of said control means being changed responsive to the operation of said test relay for making the above-mentioned connection of said test relay ineffective and placing said relay in a holding connection depending on battery encountered by said test wiper, a circuit for said magnet means and a circuit for said slow-acting means, both circuits depending on said change of condition of said control means and also depending on the condition of said test relay, the first of said circuits becoming effective to again operate said magnet means depending on the release of said test relay in case battery is absent from said test bank contact, and the second of said circuits becoming effective after a time delay to operate said slow-acting means depending on the continued operation of said test relay in case battery is present on said test bank contact.

4. In a telephone system, a finder switch having wiper and bank means including test wiper and bank means and magnet means for actuating said wiper means, a plurality of line circuits accessible to said switch, each having means responsive to the initiation of a call for marking the corresponding positions of said switch by the absence of ground and presence of battery on said test bank means, a ground-connected test relay for said switch, said magnet means being battery-connected, said test relay being connected in series with said magnet means and the junction of said magnet means and relay connected to said test wiper means, said test relay remaining shunted and said magnet means activated for advancing said wiper means as long as ground is encountered by said test wiper means, and said test relay operating incident to said test wiper means ceasing to encounter ground, and control means for causing said test bank means to be checked for the presence of battery in the position reached, the condition of said control means being changed responsive to the operation of said test relay for making the above-mentioned connection of said test relay ineffective and placing said relay in a holding connection depending on battery encountered by said test wiper means, and the subsequent release of said test relay if battery is absent from the test bank means in said position causing the magnet means to be re-activated and the first-mentioned connection of said test relay with said magnet means and said test wiper means subsequently to be rendered effective again, whereby the search for a calling line circuit is resumed in the following position of said switch.

5. In a telephone system a finder switch having a number of wipers and banks including a test wiper and bank and magnet means for actuating said wipers, a plurality of line circuits accessible to said switch, each having a test conductor for said finder normally connected to a ground and each having means responsive to the initiation of a call for switching said conductor from ground to battery, a ground-connected test relay for said switch, said magnet means being battery-connected, said test relay being connected in series with said magnet means and the junction of said magnet means and relay connected to said test wiper, said test relay remaining shunted and said magnet means activated for advancing said wipers as long as ground is encountered by said test wiper, and said test relay operating incident to said test wiper ceasing to encounter ground and control means for causing the test conductor reached to be checked for the presence of battery, the condition of said control means being changed responsive to the operation of said test relay for making the above-mentioned connection of said test relay ineffective and the holding of said relay dependent on a circuit including battery encountered by said test wiper by way of said test conductor, and the subsequent release of said test relay if battery is absent from said test conductor causing the magnet means to be re-activated and causing the first-mentioned connection of said test relay with said magnet means and said test wiper subsequently to be rendered effective again, whereby the search for a calling line circuit is resumed in the following position of said switch.

6. In a telephone system, a finder switch having a number of wipers and banks including a test wiper and bank and magnet means for actuating said wipers, a plurality of line circuits accessible to said switch each having a test conductor for said finder normally connected to ground and each having line relay means operative in response to the initiation of a call on said line circuit for switching said conductor from ground to battery, a ground-connected test relay for said switch, slow-acting relay means for causing said finder to be switched through, said magnet means being battery-connected, said test relay being connected in series with said magnet means and the junction of said magnet means and relay connected to said test wiper, said test relay remaining shunted and said magnet means activated for advancing said switch as long as ground is encountered by said test wiper and said test relay operating incident to said test wiper ceasing to encounter ground, and an auxiliary relay for checking the test conductor reached for the presence of battery, said auxiliary relay being operated responsive to the operation of said test relay for making the above-mentioned connection of said magnet means ineffective and placing said test relay in a holding circuit depending on battery encountered by said test wiper by way of said conductor and a circuit for said slow-acting relay means depending on both said auxiliary relay and said test relay being in operated condition, said circuit being effective to operate said slow-acting relay means after a time delay, whereby switch through of said finder is prevented if said holding circuit fails to become effective.

7. In a telephone system, a plurality of finder switches each having battery-connected magnet means and a number of wipers and banks including a test wiper and bank, an allotter associated in common with said finder switches and having testing means for said switches including a ground-connected test relay, a plurality of line circuits accessible to said switches, each having a finder-test-conductor normally connected to ground and each having line relay means operative in response to the initiation of a call on said line circuit to switch said conductor from ground to battery and place said allotter in a start condition, means in said allotter responsive to the setting up of said start condition for connecting said test relay in series with the magnet means of an allotted finder and connecting the junction point of said magnet means and relay to the test wiper of said finder so that ground from the test bank of said finder keeps said relay shunted and said magnet means activated for advancing said finder switch as long as said ground is encountered by said test wiper, a circuit including said test wiper and the test conductor reached thereby for checking said conductor for the presence of battery, said test relay in the allotter being operated in response to said test wiper ceasing to encounter ground for causing the above-mentioned connection of said test relay to be rendered ineffective and said testing means to be connected into said battery-checking circuit, and said testing means being effective in response to the non-completion of said circuit if battery is absent from said conductor for causing said magnet means to be re-activated and the first-mentioned connection of said test relay with said magnet means and said test wiper subsequently to be rendered effective again.

8. In a telephone system, a plurality of finder switches each having battery-connected magnet means, a switch through relay and a number of wipers and banks including a test wiper and bank, an allotter associated in common with said finder switches and having testing means for said switches including a ground-connected test relay, a plurality of line circuits accessible to said switches, each having a finder-test-conductor normally connected to ground and each having line relay means operative in response to the initiation of a call on said line circuit to switch said conductor from ground to battery and place said allotter in a start condition, means in said allotter responsive to the setting up of said start condition for connecting said test relay in series with the magnet means of an allotted finder and connecting the junction point of said magnet means and relay to the test wiper of said finder so that ground from the test bank of said finder keeps said relay shunted and said magnet means activated for advancing said finder switch as long as said ground is encountered by said test wiper, a circuit including said test wiper and the test conductor reached thereby for checking said conductor for the presence of battery, said test relay in the allotter being operated in response to said test wiper ceasing to encounter ground for causing the above-mentioned connection of said test relay to be rendered ineffective and said testing means to be connected into said battery-checking circuit, and said testing means being effective in response to the non-completion of said circuit if battery is absent from said conductor for causing said magnet means to be re-activated and the first-mentioned connection of said test relay with said magnet means and said test wiper subsequently to be rendered effective again and being effective in response to the completion of said circuit if battery is present on said conductor for causing the operation of said switch-through relay.

9. In a telephone system, a plurality of finder switches each having a first numerical switch associated therewith, each of said numerical switches including line relay means, an allotter associated in common with said finder switches and having a ground-connected test relay, and a test circuit for said allotter extending through said test relay and a winding of said line relay means in series to battery in said numerical switch, said line relay means being operated in response to the completion of said test circuit for causing holding ground to be returned to the finder switch associated with the corresponding numerical switch, and said test relay being operated in response to the completion of said circuit for seizing the last-mentioned finder switch.

10. In a telephone system, a plurality of finder switches each having a first numerical switch associated therewith, and an allotter associated in common with said finder switches and having testing means, each of said numerical switches having line relay means operative upon said numerical switch being taken into use for causing ground to be returned to hold said finder switch and guard it to said allotter, said testing means being operative upon the initiation of a finder selecting operation in said allotter for causing the selection by said allotter of a finder switch unguarded by ground and for preparing a battery-checking circuit extending from ground through said testing means and through a winding of the line relay means associated with the selected finder to battery in said numerical switch to cause the operation of said line relay means, said testing means being effective in response to the completion of said circuit if said battery is present, for starting the last-mentioned finder switch.

11. In a telephone system the combination as defined in claim 10, and wherein said testing means is effective in response to the non-completion of said battery-checking circuit to cause said allotter to select another finder switch.

12. In a telephone system, a plurality of finder switches each having a first numerical switch associated therewith, and an allotter associated in common with said finder switches and having first and second testing means, each of said numerical switches having line relay means operative upon said numerical switch being taken into use for causing ground to be returned to hold said finder switch and guard it to said allotter, said first testing means being operative upon the initiation of a finder-selecting operation in said allotter for causing the selection by said allotter of a finder switch unguarded by ground and for preparing a battery-checking circuit extending from ground through said second testing means and a winding of the line relay means of the numerical switch associated with the selected finder to battery in said numerical switch to cause the operation of said line relay means, said second testing means being effective in response to the completion of said circuit if said battery is present, for starting the last-mentioned finder switch.

13. In a telephone system the combination as defined in claim 12, and further including a circuit for starting said allotter on another finder selecting operation, the last-mentioned circuit being closed upon operation of said first testing means and non-operation of said second testing means if said battery-checking circuit cannot be completed.

14. In a telephone system, a plurality of groups of finder switches having first numerical switches associated therewith, at least a part of said numerical switches being each associated with a plurality of finders, each from a different group, a plurality of allotters each associated in common with the finders of the associated group and having testing means, each of said finder-numerical switch combinations having means operative upon being taken into use for causing guarding ground to be connected to said allotters, said testing means being operative upon the initiation of an allotting operation in said allotter for causing the selection by said allotter of a finder-numerical switch combination accessible thereto which is unguarded by ground and for preparing a battery-checking circuit extending from ground through said testing means to battery in the numerical switch of the selected one of said combinations, said testing means being effective in response to the completion only of said circuit if said battery is present for starting the last-mentioned finder switch.

15. In a telephone system the combination as defined in claim 14, and wherein said testing means is effective in response to the non-completion of said battery-checking circuit to cause said allotter to select another finder-numerical switch combination.

16. An interrupter circuit including a direct current source, an automatic interrupting apparatus comprising an electro-magnetic device and an interrupter contact in series with said device, said interrupter contact being controlled by said device to periodically open and close said interrupter circuit, control contact means in series with said automatic interrupting apparatus for controlling the beginning and end of a periodic interrupting action of said apparatus, said interrupter circuit having two spark protection devices of different counter-electromotive force dissipating effectiveness associated therewith, the spark protection device of lower effectiveness being connected to a point of said interrupter circuit intermediate said interrupter contact and said electro-magnetic device and that of higher effectiveness being connected to a point between said control contact and said apparatus.

17. An interrupter circuit including a direct current source, an automatic interrupting apparatus comprising an electro-magnetic device and an interrupter contact in series with said device, said interrupter contact being controlled by said device to periodically open and close said interrupter circuit, control contact means in series with said automatic interrupting apparatus for controlling the beginning and end of a periodic interrupting action of said apparatus said control contact means being of light-duty design as compared with said interrupter contact, said interrupter circuit having two spark protection devices of different counter-electromotive force dissipating effectiveness associated therewith, the spark protection device of lower effectiveness being connected to a point of said interrupter circuit intermediate said interrupter contact and said electro-magnetic device and that of higher effectiveness being connected to a point between said control contact and said apparatus whereby both said interrupter contact and said control contact means may be adequately protected against damage caused by sparking without unduly lowering the rate of said periodic interrupting action.

18. In combination with a stepping switch having a control wiper and bank and an automatic stepping apparatus including a stepping magnet and an interrupter contact controlled by said magnet, an automatic stepping circuit controlled by said control wiper and including in series connection a direct current source, said magnet and interrupter contact and said control wiper and bank, and two spark protection devices of different quenching effectiveness, the device of lower effectiveness being connected to a point of said interrupter circuit intermediate said stepping magnet and interrupter contact and that of higher effectiveness being connected to a point between said control wiper and bank on the one hand and said stepping apparatus on the other hand.

19. A combination as defined in claim 18, and wherein the last-mentioned spark protection device includes rectifier means connected in relationship to said magnet so as to normally oppose the flow of current from said direct current source through said rectifier means but permit counterelectromotive forces set up in said magnet upon opening of said stepping circuit at said control wiper to be dissipated through said means.

20. In combination with a stepping switch having a control wiper and bank and an automatic stepping apparatus including a stepping magnet and an interrupter contact controlled by said magnet, an automatic stepping circuit controlled by said control wiper and including in series connection a direct current source, said magnet and interrupter contact and said control wiper and bank; and two spark protection devices, one being of the silicon-carbide non-linear resistance type and connected to a point of said interrupter circuit intermediate said stepping magnet and interrupter contact so as to quench the sparks caused by the intermittent opening of said circuit at said interrupter contact during a stepping operation and the other including a germanium diode connected to a point between said control wiper and bank on the one hand and said stepping apparatus on the other hand and in relationship to said magnet so as to normally oppose the flow of current from said direct current source through said diode but permit counterelectromotive forces set up in said magnet upon opening of said stepping circuit at said control wiper at the end of a stepping operation to be dissipated through said diode.

21. A single-motion stepping switch having a stepping magnet and a set of wipers and contact banks, a plurality of groups of outlets connected to certain of said banks, said switch also having a control wiper and bank, means responsive to a series of numerical impulses, auxiliary relay means actuated under the control of said impulse responsive means, an interrupter circuit for the stepping magnet of said switch extending over said control bank and wiper, said control bank including a plurality of series of consecutive control contacts, the contacts of a given series being multipled with each other and different series of contacts being sequentially energized through actuated contacts of said auxiliary relay means to cause the wipers of said switch to be advanced, concurrently with the receipt of said series of numerical impulses over positions corresponding to an unwanted group or groups to a start position for the wanted group, and locking means associated with said auxiliary relay means for holding said relay means upon its actuation, independently of said impulse responsive means, said locking means being controlled over a wiper and bank of said switch for rendering said locking means ineffective incident to said switch being advanced beyond the positions corresponding to the respective series of control contacts, whereby the advancement of said switch over said series of positions is insured regardless of said impulse responsive means changing their condition during said last-mentioned advancement.

22. A single-motion stepping switch having a stepping magnet and a set of wipers and contact banks, a plurality of groups of outlets connected to certain of said banks, said switch also having a control wiper and bank, means responsive to a series of numerical impulses, auxiliary relay means actuated under the control of said impulse responsive means, an interrupter circuit for the stepping magnet of said switch extending over said control bank and wiper, said control bank including a plurality of series of consecutive control contacts, the contacts of a given series being multipled with each other and different series of contacts being sequentially energized through actuated contacts of said auxiliary relay means to cause the wipers of said switch to be advanced, concurrently with the receipt of said series of numerical impulses, over positions corresponding to an unwanted group or groups to a start position for the wanted group, and locking means associated with said auxiliary relay means for holding said relay means upon its actuation, independently of said impulse responsive means, said locking means being controlled by way of said control wiper and bank for rendering said locking means ineffective incident to said control wiper being advanced beyond the contacts of the respective series of control contacts, whereby the advancement of said switch over the positions corresponding to said contact series is insured regardless of said impulse responsive means changing their condition during said last-mentioned advancement.

23. A single-motion stepping switch having a stepping magnet and a set of wipers and contact banks, a plurality of groups of outlets connected to certain of said banks, said switch also having a control wiper and bank, an impulse relay responsive to a series of numerical impulses, auxiliary impulse relay means actuated under the control of said impulse relay, an interrupter circuit for the stepping magnet of said switch extending over said control wiper, two control conductors, one multipled to contacts of said control bank in the start position of said groups and the other multipled to contacts of said control bank in another predetermined position of said groups, the contacts of said control bank in positions intermediate said start position and predetermined position of said groups also being multipled to said first-mentioned conductor and said interrupter circuit being energized alternately over said two control conductors under the control of said impulse relay, each of said two conductors once for each numerical impulse, whereby the wipers of said switch are advanced concurrently with the receipt of said impulse series over positions corresponding to an unwanted group or groups, to the start position of the wanted group, the energization of said interrupter circuit by way of said first conductor being effected through actuated contacts of said auxiliary relay means, and said auxiliary relay means having associated therewith locking means for holding said relay means, upon its actuation, independently of said impulse relay, said locking means being controlled over a wiper and bank of said switch for rendering said locking means ineffective incident to said switch being advanced beyond the last of the respective intermediate positions, whereby the advancement of said switch over the last-mentioned positions is insured regardless of a change of condition of said impulse relay during the last-mentioned advance.

24. A single-motion stepping switch as defined in claim 23, and wherein said locking means includes a winding of said auxiliary relay means, said winding being energized, upon actuation of said relay means, in a circuit extending over said first control conductor and said control wiper, whereby said relay means is held actuated until both said impulse relay has reoperated and said control wiper has been advanced out of engagement with the control contacts in said intermediate positions.

25. A single-motion stepping switch as defined in claim 24, and wherein said auxiliary relay means has other contacts for energizing said interrupter circuit by way of said second-mentioned control conductor each time said relay means is restored to its original condition.

26. A single-motion stepping switch as defined in claim 24 and being in the form of a selector switch having means effective incident to the termination of said series of numerical impulses for starting said switch on a trunk-hunting operation in search of a free outlet in the selected group and for reoperating said auxiliary relay means by way of said control wiper and said winding, and means controlled by the release of said relay means at the end of said trunk-hunting operation if all outlets in said group are busy, for causing a busy signal to be returned by said switch.

27. A single-motion stepping switch having a stepping magnet and a set of wipers and contact banks, a plurality of groups of outlets connected to certain of said banks, said switch also having a control wiper and bank, an impulse relay responsive to a series of numerical impulses, a lock pulse relay, an interrupter circuit for the stepping magnet of said switch extending over said control wiper, two control conductors, one multipled to contacts of said control bank in a number of series of consecutive positions and the other multipled to contacts of said control bank in another number of positions of said switch, contacts of said two kinds of positions alternating with each other in said control bank and said interrupter circuit being energized alternately over said two conductors under the control of said impulse relay, whereby the wipers of said switch are advanced concurrently with the receipt of said impulse series, over positions corresponding to an unwanted group or groups to the start position of the wanted group, the energizing circuit extending over the first-mentioned conductor being jointly controlled by a break contact of said impulse relay and a make contact of said lock pulse relay and said lock pulse relay upon operation incident to each release of said impulse relay being placed in a locking circuit extending over said first-mentioned conductor, whereby the energization of said interrupter circuit over said first-mentioned conductor is initially effected in immediate response to the release of said impulse relay and is maintained by said lock pulse relay regardless of the reoperation of said impulse relay as long as said control wiper is in engagement with a contact of the corresponding series.

28. A numerical stepping switch of the single motion type having a stepping magnet and a number of wipers and contact banks including a plurality of sets of talking and test wipers and banks having a plurality of groups of outlets connected thereto, and also including a control wiper and bank common to said plurality of wipers and bank sets, means responsive to the receipt of a series of numerical impulses, an interrupter circuit for said magnet activated under the joint control of said impulse responsive means and said control wiper and bank for causing said magnet to be operated, concurrently with the receipt of said impulse series, a given number of times per numerical impulse, whereby said wipers are advanced over positions corresponding to outlets of an unwanted group or groups to the start position of the wanted group, switching means for selectively connecting up a predetermined one of said sets of talking and test wipers, and circuits extending over and controlled by a wiper and bank of said switch for selectively operating said switching means.

29. A single-motion stepping switch having a stepping magnet and a plurality of sets of wipers and contact banks, a plurality of groups of contacts connected to certain of said banks, said switch also having a control wiper and bank common to said plurality of wipers and bank sets, an impulse relay, an interrupter circuit for said magnet activated under the joint control of said impulse relay and said control wiper and bank for causing said magnet to be operated responsive to and concurrently with the receipt of a series of numerical impulses, a given number of times per numerical impulse, whereby said wipers are advanced over positions corresponding to outlets of an unwanted group or groups to the start position of the wanted group, switching means for selectively making a predetermined one of said sets of wipers effective, and circuits extending over and controlled by said common control wiper in said start positions for causing the selective operation of said switching means in one of the last-mentioned positions.

30. A single-motion stepping switch having a stepping magnet and two sets of wipers and contact banks, a plurality of odd- and even-numbered groups of outlets respectively connected to said two sets of bank, switching means for selectively making one of said two sets of wipers effective, said switch also having a control wiper and bank common to said two wiper and bank sets, an impulse relay, an interrupter circuit for said magnet extending over said control wiper, control connections to said control bank including two control conductors each multipled to a separate set of contacts of said control bank so that contacts forming part of one set are interspersed with contacts forming part of the other set, said impulse relay being responsive to a received series of numerical impulses for causing said interrupter circuit to be energized alternately over said two control conductors, thereby to advance the wipers of said switch, concurrently with the receipt of said impulse series, over positions corresponding to an unwanted group or groups to a start position for the wanted group, and means effective upon termination of said series of impulses for splitting the contact multiple connected to one of said control conductors into two component multiples comprising contacts in the start positions of odd- and even-numbered groups respectively, said switching means being respectively connected to one of said component multiples, and circuits extending over and controlled by said common control wiper in said start positions for causing the selective operation of said switching means over one of said component multiples.

31. A single-motion stepping switch having a stepping magnet and a number of wipers and contact banks including a plurality of sets of banks to each of which a plurality of groups of outlets is connected, said groups comprising both restricted and non-restricted groups, and also including a discriminating wiper and bank and a control wiper and bank, both common to said plurality of wipers and bank sets, an impulse relay, an interrupter circuit for said magnet activated under the joint control of said impulse relay and said control wiper and bank for causing said magnet to be operated, responsive to and concurrently with the receipt of a series of numerical impulses, a given number of times per numerical impulse, whereby said wipers are advanced over positions corresponding to outlets of an unwanted group or groups to the start position of the wanted group, switching means for selectively making a predetermined one of said sets of wipers effective and circuits extending over and controlled by a wiper and bank of said switch for selectively operating said switching means, an enabling potential for said switching means being connected to said discriminating bank in start positions for non-restricted ones of said groups only, whereby if said impulse series denotes a restricted group none of said wiper sets is permitted to become effective.

32. A single-motion numerical switch of the trunk-hunting type having a stepping magnet and a set of wipers and contact banks including a test wiper and bank, a plurality of groups of outlets connected to said banks, said switch also having a control wiper and bank, means responsive to the receipt of a series of numerical impulses, an interrupter circuit for said magnet activated under the joint control of said impulse responsive means and said control wiper and bank for causing said magnet to be operated concurrently with the receipt of said impulse series, a given number of times per numerical impulse, whereby said wipers are advanced over positions corresponding to an unwanted group or groups to the start position of the wanted group, and means effective incident to the termination of said impulse series for connecting said test wiper to predetermined contacts in said contact bank, said interrupter circuit being energized over said test bank and wiper and said control bank and wiper in series to cause the wipers of said switch to be further advanced in search of a free outlet in the last-mentioned group.

33. A single-motion selector switch having a stepping magnet and one or more sets of wipers and contact banks including a test wiper and bank, a plurality of groups of outlets connected to said banks, said switch also having a control wiper and bank, an impulse relay responsive to a series of received numerical impulses, an interrupter circuit for the stepping magnet of said switch extending over said control bank and wiper, and a switching relay, said control bank including a plurality of series of consecutive control contacts, the contacts of a given series being multipled with each other and different series of contacts being sequentially energized under the control of said impulse relay to cause the wipers of said switch to be advanced, concurrently with the receipt of said series of numerical impulses, over positions corresponding to an unwanted group or groups to a start position for the wanted group, and means effective incident to the termination of said impulse series for connecting said test wiper to said switching relay and connecting the junction of said switching relay and test wiper to predetermined ones of said control contacts, whereby, if the outlet or outlets of the last-mentioned group which are connected to said start position are idle, said switching relay is operated in series with said magnet, and, if said outlets are busy, said interrupter circuit is energized over said test bank and wiper and said control bank and wiper in series to cause the wipers of said switch to be further advanced in search of a free outlet in said groups.

34. A single-motion selector switch having a stepping magnet and one or more sets of wipers and contact banks including a test wiper and bank, a plurality of groups of outlets connected to said banks, said switch also having a control wiper and bank, an impulse relay responsive to a series of received numerical impulses, an interrupter circuit for the stepping magnet of said switch extending over said control bank and wiper, and a switching relay, said control bank including a plurality of series of consecutive control contacts, the contacts of a given series being multipled with each other and different series of contacts being sequentially energized under the control of said impulse relay to cause the wipers of said switch to be advanced, concurrently with the receipt of said series of numerical impulses, over positions corresponding to an unwanted group or groups to a start position for the wanted group, and means effective incident to the termination of said impulse series for connecting said test wiper to as many of said series of control contacts as contain contacts in positions of the last-mentioned group but excepting the series containing the contact corresponding to the last position of said group, said interrupter circuit being energized over said test bank and wiper and said control bank and wiper in series to cause the wipers of said switch to be further advanced in search of a free outlet in said group.

35. A single-motion selector switch as defined in claim 34, and further including relay means connected to said control wiper and operated during said searching operation in a circuit extending over said test bank and wiper and said control bank and wiper in series, and means responsive to the release of said relay means incident to the last-mentioned circuit being disabled by said control wiper in said last position for causing a busy signal to be returned by said switch.

36. A single-motion numerical switch having a plurality of sets of wipers and contact banks, a member carrying said wipers, magnet means for actuating said member, groups of outlets connected to each of said sets of banks, each group having a start position, the start position of a plurality of said groups in one set of banks occurring in different positions of said member with respect to the start positions of a plurality of said groups in another set of banks and in cyclically alternating relation therewith, said switch also having a control wiper and bank common to said plurality of wipers and bank sets, said control wiper also being carried by said member, an interrupter circuit for said magnet means extending over said control wiper, control connections to said control bank including two control conductors each multipled to a separate set of contacts of said control bank so that contacts forming part of one contact set are interspersed with contacts forming part of the other contact set, and means responsive to a received series of numerical impulses for causing said interrupter circuit to be energized alternately over said two conductors, thereby to advance said member, concurrently with the receipt of said impulse series, to the start position of the wanted group, and means cyclically operable depending on the number of impulses in said series for selectively making the corresponding one of said wiper sets effective.

37. A single-motion numerical switch having magnet means, two sets of wipers and contact banks, a plurality of groups of contacts connected to said banks, each group having a start position, odd-numbered groups being connected to one bank set and even-numbered groups being connected to the other bank set but in staggered relation to said odd-numbered groups so that the start positions of the odd-numbered groups alternate with the start positions of the even-numbered groups, said switch also having a control wiper and bank common to said two wiper and bank sets, an interrupter circuit for said magnet means extending over said control wiper, control connections to said control bank including two control conductors each multipled to a separate set of contacts of said control bank so that contacts forming part of one contact set are interspersed with contacts forming part of the other contact set, means responsive to a received series of numerical impulses for causing said interrupter circuit to be energized alternately over said two control conductors, thereby to advance the wipers of said switch, concurrently with the receipt of said impulse series, to a position forming the start position for the wanted group, and means operative depending on whether the number of received impulses is odd or even for selectively making one or the other of said two wiper sets effective.

38. A single-motion numerical switch having a stepping magnet, a number of wiper means and associated contact banks including a first and a second set of talking and test wiper means and banks, a plurality of groups of outlets connected to said banks, each group having a start position, the odd-numbered groups being connected to said first bank set and the even-numbered groups being connected to said second bank set but in staggered relation to said odd-numbered group so that the start positions of the even-numbered groups alternate with the start positions of the odd-numbered groups, and outlets of the group defined by the highest even number being connected to the initial positions of said second bank set, said wiper means and banks also including a control wiper means and bank common to said two sets, means responsive to a received series of impulses, said magnet being activated under the joint control of said impulse responsive means and said control wiper means a given number of times per numerical impulse, whereby said wiper means are ineffectually advanced, concurrently with the receipt of impulse series, over said initial positions to the start position of the wanted group, and means operative incident to the termination of said impulse series for selectively making said first or second set of wiper means effective depending on whether the number of impulses of said series is odd or even and also operative incident to the termination of said series for enabling said switch if the highest even number of impulses has been received to seize one of said initial outlets at the time said second set of wiper means re-engages said initial outlets subsequent to one traverse of said second set of banks by the last-mentioned wiper means.

39. A single-motion numerical switch as defined in claim 38 and wherein outlets of the group defined by the highest odd number are connected to initial positions of the first-mentioned set of banks, the first impulse of said series serving to advance said first wiper means over the last-mentioned initial positions to the start position of the first group.

40. In a telephone system a plurality of lines, a numerical switch accessible to said lines and having a set of wipers and contact banks, a plurality of groups of outlets connected to said banks, said switch having associated therewith means responsive to a received series of impulses for causing said wipers to be selectively set opposite a desired one of said groups, relay means normally operative upon the termination of said impulse series for effecting a busy test of the outlets in the selected group, and means for denying non-privileged ones of said lines effective access to a certain one or ones of said groups, the last-mentioned means including an incoming conductor, an enabling potential connected to said conductor at privileged ones only of said lines, a discriminating wiper and bank, and an enabling potential connected only to contacts in said bank which correspond to groups other than said certain groups, said relay means being alternatively controlled by said first- and second-mentioned enabling potential so that only the concurrent absence of enabling potential from both said incoming conductor and the selected contact of said discriminating bank prevent the above-mentioned relay means from becoming operative.

41. In a telephone system the combination as defined in claim 40, and wherein said relay means has an operating winding to which said incoming conductor and said discriminating wiper are connected in multiple.

42. In a telephone system the combination as defined in claim 41, and wherein there are provided a number of numerical switches of the same rank all of which are accessible to said plurality of lines and all of which have access, by way of their banks, to said groups of outlets; wherein the contacts of said discriminating bank corresponding to said start positions are multipled between said plurality of switches; wherein said enabling potential is a direct current potential; and wherein unidirectional current means are interposed in said connection between said incoming conductor and said discriminating wiper in said switches for preventing back-feeding of said potential from one to the other of said switches by way of said discriminating bank multiple.

43. In a telephone system, a plurality of lines, a numerical switch of the single-motion type accessible to said lines and having a set of wipers and contact banks, a plurality of groups of outlets connected to said banks, said switch having associated therewith means responsive to a received series of impulses for causing the selective advancement of said wipers to a start position for a desired one of said groups, relay means normally effective upon the termination of said impulse series for permitting said wipers to be further advanced from said start position in search of an idle outlet in the selected group, and means for denying non-privileged ones of said lines effective access to a vertain one or ones of said groups, the last-mentioned means including an incoming conductor, an enabling potential connected to said conductor at privileged ones only of said lines, a discriminating wiper and bank, and an enabling potential connected to contacts in said bank corresponding to the start position only of groups other than said certain groups, said relay means being alternatively controlled by said first- and second-mentioned enabling potential so that only the concurrent absence of enabling potential from both said incoming conductor and from the contact of said discriminating bank corresponding to said selected start position prevents the above-mentioned relay means from becoming effective.

44. In a telephone system the combination as defined in claim 43, and wherein said relay means has an operating winding to which said incoming conductor and said discriminator wiper are connected in multiple.

45. In a telephone system the combination as defined in claim 44, and wherein there are provided a number of numerical switches of the same rank all of which are accessible to said plurality of lines and all of which have access, by way of their banks, to said groups of outlets; wherein the contacts of said discriminating bank corresponding to said start positions are multipled between said plurality of switches; wherein said enabling potential is a direct current potential; and wherein unidirectional current means are interposed in said connection between said incoming conductor and said discriminating wiper in said switches for preventing back-feeding of said potential from one to the other of said switches by way of said discriminating bank multiple.

References Cited in the file of this patent

UNITED STATES PATENTS

| | | |
|---|---|---|
| 1,914,391 | Wolf | June 20, 1933 |
| 2,093,242 | Humphries et al. | Sept. 14, 1937 |